(12) United States Patent
Rabie et al.

(10) Patent No.: US 7,014,173 B2
(45) Date of Patent: Mar. 21, 2006

(54) CYCLIC AERATION SYSTEM FOR SUBMERGED MEMBRANE MODULES

(75) Inventors: Hamid R. Rabie, Mississauga (CA); Pierre Lucien Cote, Dundas (CA); Manwinder Singh, Burlington (CA); Arnold Janson, Burlington (CA); Steven Kristian Pedersen, Burlington (CA); Henry Behmann, Puslinch (CA)

(73) Assignee: ZENON Environmental Inc., Oakville (CA)

( * ) Notice: Subject to any disclaimer, the term of this patent is extended or adjusted under 35 U.S.C. 154(b) by 176 days.

(21) Appl. No.: 10/680,145

(22) Filed: Oct. 8, 2003

(65) Prior Publication Data

US 2004/0112831 A1   Jun. 17, 2004

Related U.S. Application Data

(63) Continuation-in-part of application No. 10/369,699, filed on Feb. 21, 2003, now Pat. No. 6,706,189, which is a continuation of application No. 09/814,737, filed on Mar. 23, 2001, now Pat. No. 6,550,747, which is a continuation-in-part of application No. 09/488,359, filed on Jan. 19, 2000, now Pat. No. 6,245,239, which is a continuation of application No. PCT/CA99/00940, filed on Oct. 7, 1999.

(60) Provisional application No. 60/417,560, filed on Oct. 11, 2002, provisional application No. 60/116,591, filed on Jan. 20, 1999, provisional application No. 60/103,665, filed on Oct. 9, 1998.

(30) Foreign Application Priority Data

| Jan. 14, 1999 | (CA) | ................................. 2258715 |
| Jul. 20, 1999 | (CA) | ................................. 2278085 |
| Jul. 30, 1999 | (CA) | ................................. 2279766 |

(51) Int. Cl.
B01F 3/04   (2006.01)

(52) U.S. Cl. .................... 261/23.1; 261/43; 261/122.2; 261/124; 210/138; 210/321.79; 210/321.88

(58) Field of Classification Search ............... 261/23.1, 261/28, 43, 59, 64.1, 122.1, 124, 122.2; 210/636, 210/641, 644, 649, 650–652, 138, 142, 321.67, 210/321.69, 321.75, 321.78, 321.79, 321.84, 210/321.88
See application file for complete search history.

(56) References Cited

U.S. PATENT DOCUMENTS 4,923,614 A   5/1990   Engelbart (Continued)

FOREIGN PATENT DOCUMENTS

DE   3318412 A1   11/1984

(Continued)

OTHER PUBLICATIONS

"Summons to Oral Proceedings", regarding European Patent Application No. 99 947 155.0, dated May 27, 2003.

(Continued)

*Primary Examiner*—Scott Bushey
(74) *Attorney, Agent, or Firm*—Bereskin & Parr

(57) ABSTRACT

An aeration system for a submerged membrane module has a set of aerators connected to an air blower, valves and a controller adapted to alternately provide a higher rate or air flow and a lower rate of air flow in repeated cycles. In an embodiment, the air blower, valves and controller, simultaneously provide the alternating air flow to two or more sets of aerators such that the total air flow is constant, allowing the blower to be operated at a constant speed. In another embodiment, the repeated cycles are of short duration. Transient flow conditions result in the tank water which helps avoid dead spaces and assists in agitating the membranes.

28 Claims, 31 Drawing Sheets

U.S. PATENT DOCUMENTS

| | | |
|---|---|---|
| 5,248,424 A | 9/1993 | Cote et al. |
| 5,480,553 A | 1/1996 | Yamamori et al. |
| 5,639,373 A | 6/1997 | Mahendran et al. |
| 5,783,083 A | 7/1998 | Henshaw et al. |
| 5,910,250 A | 6/1999 | Mahendran et al. |
| 5,922,201 A | 7/1999 | Yamamori et al. |
| 5,944,997 A | 8/1999 | Pedersen et al. |
| 6,042,677 A | 3/2000 | Mahendran et al. |
| 6,193,890 B1 | 2/2001 | Pedersen et al. |
| 6,245,239 B1 | 6/2001 | Cote et al. |
| 6,280,626 B1 | 8/2001 | Miyashita et al. |
| 6,284,135 B1 | 9/2001 | Ookata |
| 6,319,411 B1 | 11/2001 | Cote |
| RE37,549 E | 2/2002 | Mahendran et al. |
| 6,550,747 B1 | 4/2003 | Rabie et al. |
| 6,706,189 B1 * | 3/2004 | Rabie et al. ............ 210/636 |
| 6,863,823 B1 * | 3/2005 | Cote ........................ 210/659 |
| 6,881,343 B1 * | 4/2005 | Rabie et al. ............ 210/636 |
| 6,899,812 B1 * | 5/2005 | Cote et al. ............... 210/636 |
| 2001/0027951 A1 | 10/2001 | Gungerich et al. |

FOREIGN PATENT DOCUMENTS

| | | |
|---|---|---|
| EP | 0937494 | 8/1999 |
| JP | 06-057302 | 1/1985 |
| JP | 61107905 | 5/1986 |
| JP | 01-168304 | 7/1989 |
| JP | 4180821 | 6/1992 |
| JP | 04-265128 | 9/1992 |
| JP | 08-004722 | 9/1992 |
| JP | 4256425 | 9/1992 |
| JP | 2641341 | 1/1993 |
| JP | 7100486 | 4/1995 |
| JP | 7-185270 | 7/1995 |
| JP | 07-185271 | 7/1995 |
| JP | 7-185271 | 7/1995 |
| JP | 7251042 | 10/1995 |
| JP | 8-187494 | 7/1996 |
| JP | 2904564 | 7/1996 |
| JP | 08-323161 | 12/1996 |
| JP | 2946072 | 12/1996 |
| JP | 09-220569 | 8/1997 |
| WO | WO 97/06880 | 2/1997 |
| WO | WO 99/29630 | 6/1999 |

OTHER PUBLICATIONS

English translation of Official Action regarding Japanese Patent Application No. 2000-575802, dated May 26, 2003.

International Preliminary Examination Report regarding Intrnational Application No. PCT/CA99/00940, dated Feb. 9, 2001.

Written Opinion regarding International Application No. PCT/CA99/00940, dated Nov. 7, 2000.

Written Opinion regarding International Application No. PCT/CA99/00940, dated Jul 14, 2000.

* cited by examiner

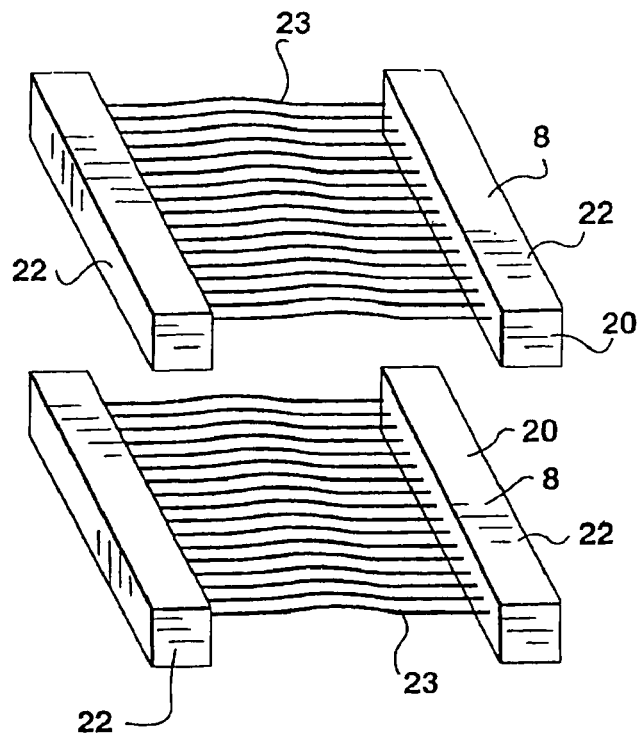
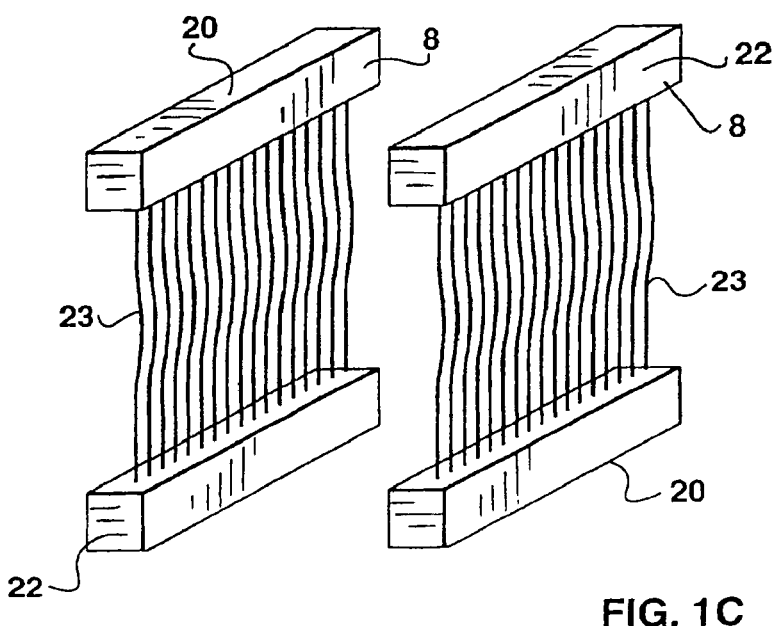
FIG. 1B
FIG. 1C

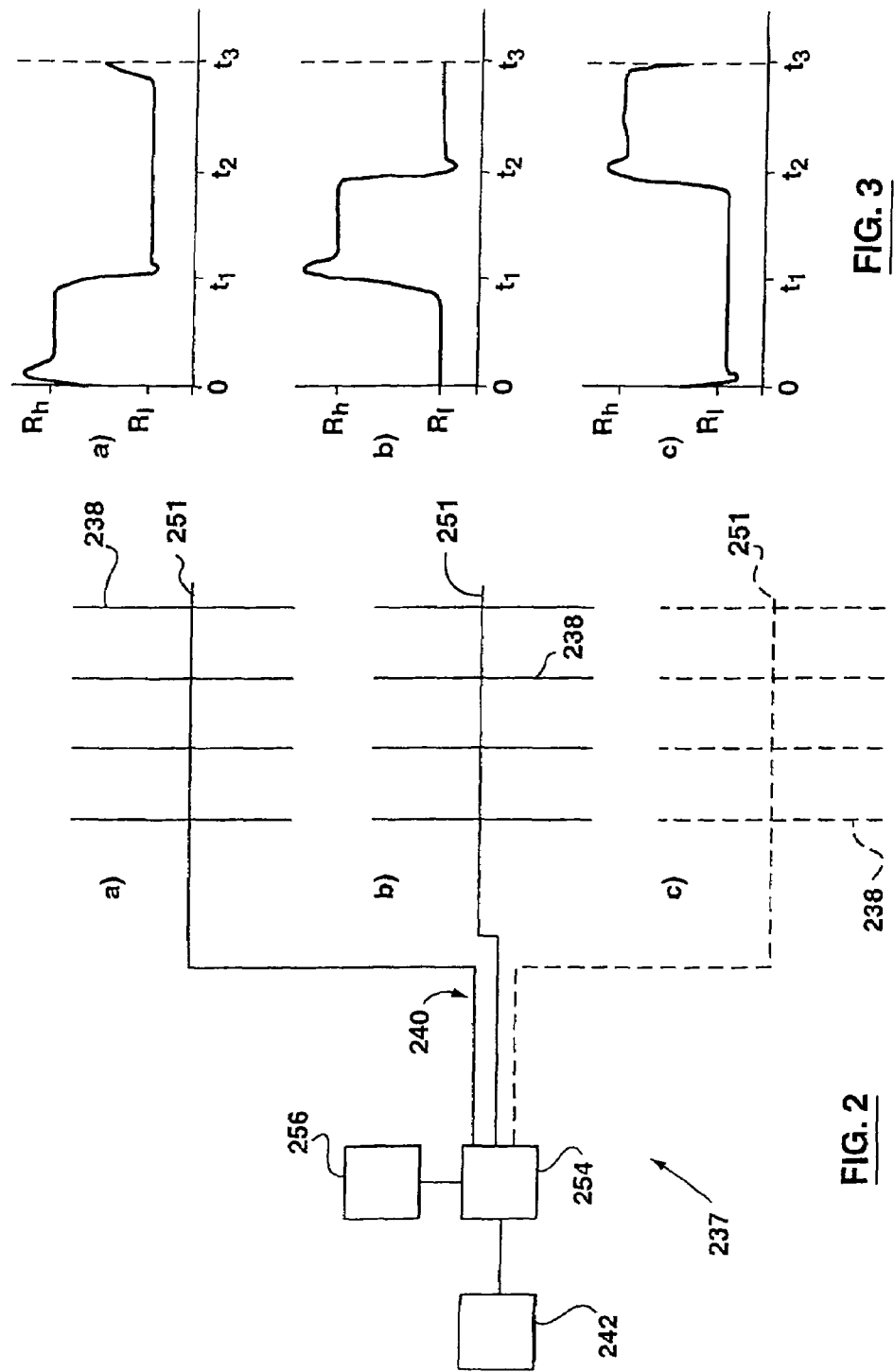

CYCLIC AERATION SYSTEM FOR SUBMERGED MEMBRANE MODULES

This is an application claiming the benefit under 35 USC 119(e) of Provisional Application No. 60/417,560, filed Oct. 11, 2002 and a continuation-in-part of U.S. patent application No. 10/369,699, filed Feb. 21, 2003, issued as Pat. No. 6,706,189 on Mar. 16, 2004, which is a continuation of U.S. application Ser. No. 09/814,737, filed Mar. 23, 2001, issued as U.S. Pat. No. 6,550,747 on Apr. 22, 2003, which is a continuation-in-part of U.S. application Ser. No. 09/488,359, filed Jan. 19, 2000, issued as U.S. Pat. No. 6,245,239 on Jun. 12, 2001, which is a continuation of international application number PCT/CA99/00940, tiled Oct. 7, 1999, which is an application claiming the benefit under 35 USC 119(e) of Provisional Application Nos. 60/103,665, filed Oct. 9, 1998 and 60/116,591, filed Jan. 20, 1999, both abandoned. All of U.S. application Ser. Nos. 10/369,699; 09/814,737; 09/488,359; 60/103,665 filed Oct. 9, 1998; 60/116,591, filed Jan. 20, 1999; and 60/201,725, filed May 4, 2000; and Canadian Application Nos CA2,258,715, filed Jan. 14, 1999; CA2,278,085, filed Jul. 20, 1099; and CA2,279,766, filed Jul. 30, 1999 and international application number PCT/CA99/00940 are incorporated herein by this reference to them.

FIELD OF THE INVENTION

This invention relates to using scouring air bubbles produced by an aeration system to clean or inhibit the fouling of membranes in a submerged membrane filter or bioreactor.

BACKGROUND OF THE INVENTION

Submerged membranes are used to treat liquids containing solids to produce a filtered liquid lean in solids and an unfiltered retentate rich in solids. For example, submerged membranes are used to withdraw substantially clean water from wastewater and to withdraw potable water from water from a lake or reservoir.

The membranes are generally arranged in modules which comprise the membranes and one or more headers attached to the membranes. The modules are immersed in a tank of water containing solids. A transmembrane pressure is applied across the membrane walls which causes filtered water to permeate through the membrane walls. Solids are rejected by the membranes and remain in the tank water to be biologically or chemically treated or drained from the tank.

Air bubbles are introduced to the tank through aerators mounted below the membrane modules and connected by conduits to an air blower. The air bubbles rise to the surface of the tank water and create an air lift which recirculates tank water around the membrane module. When the rate of air flow is within an effective range, the rising bubbles and tank water scour and agitate the membranes to inhibit solids in the tank water from fouling the pores of the membranes. Further, there is also an oxygen transfer from the bubbles to the tank water which, in wastewater applications, provides oxygen for microorganism growth. The air blower generally runs continuously to minimize stress on the air blower motors and to provide a constant supply of air for microorganism growth if desired.

With typical aeration systems, an operator increases the rate of air flow to the aerators if more cleaning is desired. This technique, however, stresses the membranes and air blower motors and increases the amount of energy used which significantly increases the operating costs of the process. Conversely, an operator typically decreases the rate of air flow to the aerators if less cleaning is desired. With this technique, however, the rate of air flow is often below the effective range, which does not provide efficient cleaning. Alternately, some operators reduce the average rate of air flow by providing air intermittently. This method allows for an air flow rate in the effective range but at the expense of the air blowers which wear rapidly when turned off and on frequently. In many cases, the warranty on the air blower is voided by such intermittent operation.

Another concern with typical aeration systems is that they cause the tank water to move in a generally steady state recirculation pattern in the tank. The recirculation pattern typically includes "dead zones" where tank water is not reached by the recirculating tank water and bubbles. The membranes in these dead zones, or the parts of the membranes in these dead zones, are not effectively cleaned and may be operating in water having a higher concentration of solids than in the tank water generally. Accordingly, these membranes, or the affected parts of these membranes, quickly foul with solids.

A related problem occurs in modules where hollow fibre membranes are installed with a small degree of slack to allow the membranes to move and shake off or avoid trapping solids. The movement of tank water in the tank encourages slackened membranes to assume a near steady state position, particularly near the ends of the membranes, which interferes with the useful movement of the fibres.

Yet another concern with current aeration systems is that the aerators themselves often foul over time. Even while the air supply is on, the local air pressure near the perimeter of the aerator holes is low and often allows tank water to seep into the aerator. When aeration is stopped from time to time, for example for backwashing, cleaning or other maintenance procedures, more tank water may enter the aeration system. A portion of the tank water entering the aeration system evaporates there, leaving deposits of solids in the aeration system. In wastewater applications in particular, the deposited solids can significantly reduce the efficiency of the aeration system or cause an operator to periodically shut down filtration to clean or replace the aerators.

SUMMARY OF THE INVENTION

It is an object of the invention to improve on the prior art. This object is met by the combination of elements or steps described in the claims.

It is another object of the present invention to provide a cyclic aeration system that may be used for aerating ultrafiltration and microfiltration membranes modules immersed in tank water in a tank. The cyclic aeration system uses a valve set and a valve set controller to connect an air supply to a plurality of distinct branches of an air delivery network. The distinct branches of the air delivery network are in turn connected to aerators located below the membrane modules. While the air supply is operated to supply a steady initial flow of air, the valve set and valve set controller split and distribute the initial air flow between the distinct branches of the air distribution system such that the air flow to each distinct branch alternates between a higher flow rate and a lower flow rate in repeated cycles.

In an embodiment, the valves in the valve set open or close in less than about 5 seconds, preferably less than about 3 seconds. The valve or valves associated with each distinct branch of the air delivery network begin to either open or close, or both, automatically with or in response to the opening or closing of a valve or valves associated with another distinct branch of the air delivery system. For example, the valve or valves associated with each distinct branch of the air delivery network begin to either close automatically with or in response to the opening, preferably to a fully open state, of the valve or valves associated with another distinct branch of the air delivery system. Additionally, position sensors may be fitted to the valves and the valve set controller configured such that the failure of a valve or valves to open as desired prevents closure of the valve or valves associated with another distinct branch of the air delivery system.

In another embodiment, the cyclic aeration system is used to provide intermittent aeration to membrane modules arranged in a plurality of filtration zones, each associated with a distinct branch of the air delivery network. The cyclic aeration system is configured and operated to provide aeration for a predetermined amount of time to each filtration zone in turn. In other embodiment, the cyclic aeration system is used to provide intense aeration to a group of membrane modules. In one such embodiment, the cyclic aeration system is configured and operated to provide air to a branch of the air delivery network alternating between a higher flow rate and a lower flow rate in cycles of 120 seconds or less. In another such embodiment, aerators associated with a first branch of the air delivery network are interspersed with aerators associated with one or more other branches of the air delivery network. Air flow at a higher flow rate is alternated between the branches of the air delivery network in cycles of 120 seconds or less. Where n distinct branches of the air delivery system are provided, air may flow at the higher rate in each distinct branch for about one nth of each cycle.

BRIEF DESCRIPTION OF THE DRAWINGS

Preferred embodiments of the present invention will now be described with reference to the following figures.

FIGS. 1B, 1C and 1D are drawings of membrane modules according to embodiments of the present invention.

FIG. 2 is a plan view schematic of an aeration system according to an embodiment of the present invention.

FIG. 3 is a series of graphs showing the effect of operating an embodiment of the present invention.

DETAILED DESCRIPTION OF THE INVENTION

General Description

Figure 1A:
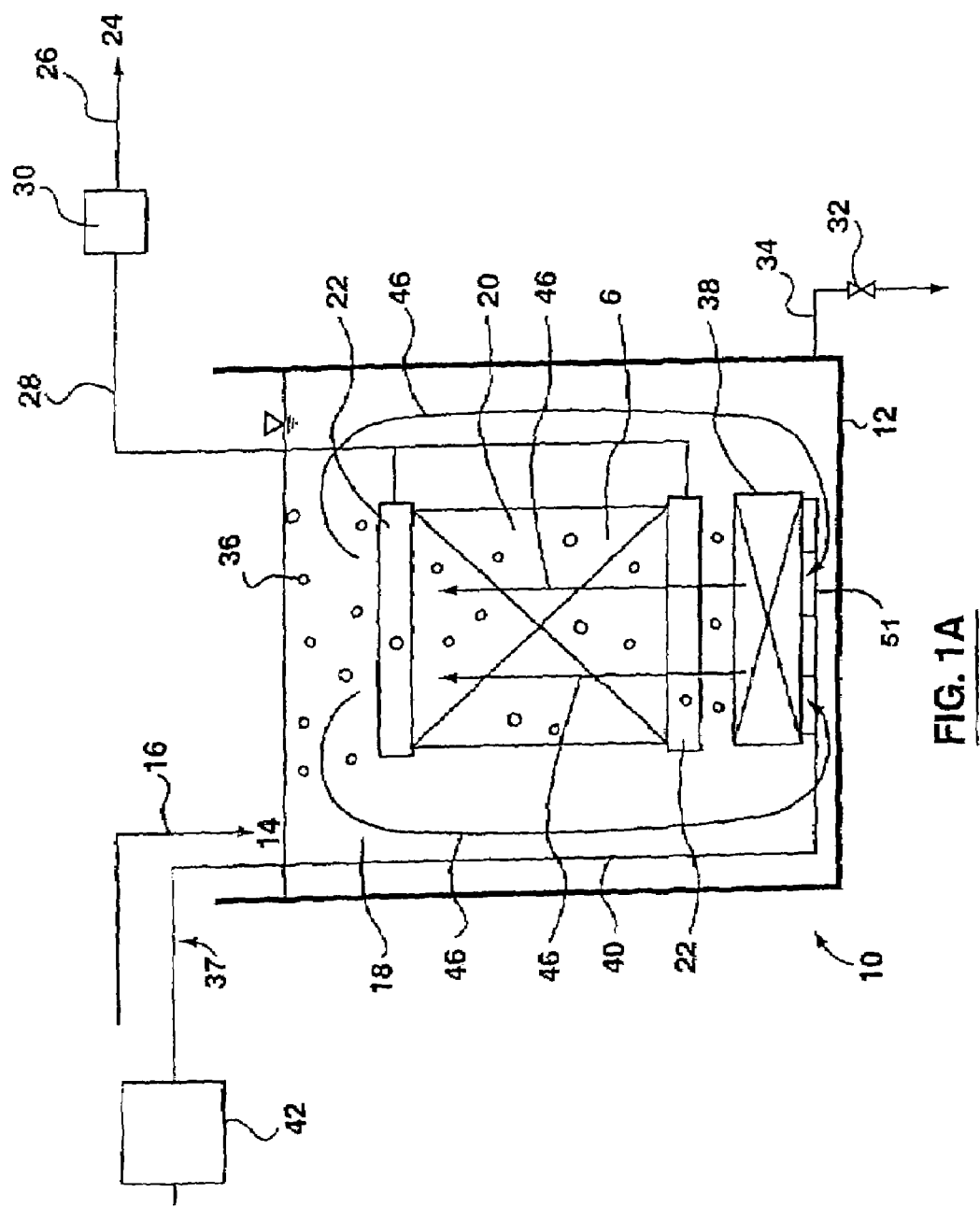
FIG. 1A is a schematic drawing of a submerged membrane reactor.

Referring now to FIG. 1A, the general arrangement of a reactor 10 is shown. The description of the reactor 10 in this section applies generally to various embodiments to be described below to the extent that it is not inconsistent with the description of any particular embodiment.

The reactor 10 has a tank 12 which is initially filled with feed water 14 through an inlet 16. The feed water 14 may contain microorganisms, suspended solids or other matter which will be collectively called solids. Once in the tank, the feed water 14 becomes tank water 18 which may have increased concentrations of the various solids, particularly where the reactor 10 is used to treat wastewater.

One or more membrane modules 20 are mounted in the tank and have one or more headers 22 in fluid communication with a permeate side of one or more membranes 6. The membranes 6 in the membrane modules 20 have a pore size in the microfiltration or ultrafiltration range, preferably between 0.003 and 10 microns.

Membrane modules 20 are available in various sizes and configurations with various header configurations. For example, the membranes 6 may be hollow fibres potted in one or more headers 22 such that the lumens of the hollow fibres are in fluid communication with at least one header 22. The headers 22 may be of any convenient shape but typically have a rectangular or round face where they attach to the membranes 6. Alternatively, the membranes 6 may be flat sheets which are typically oriented vertically in a spaced apart pair with headers 22 on all four sides in fluid communication with the resulting interior surface. A membrane module 20 may have one or more microfiltration or ultrafiltration membranes 6 and many membrane modules 20 may be joined together to form larger membrane modules, or cassettes, but all such configurations will be referred to as membrane modules 20.

Figure 1D:
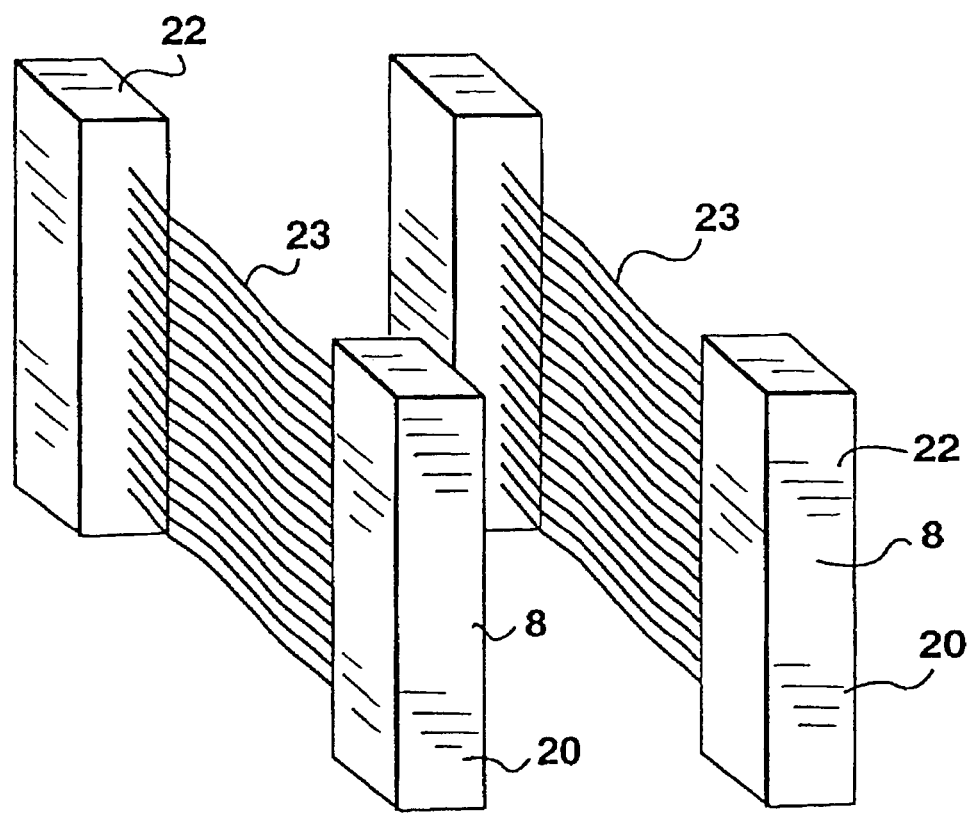

FIGS. 1B, 1C and 1D illustrate preferred membrane modules 20 having rectangular skeins 8. In each rectangular skein 8, hollow fibre membranes 23 are held between two opposed headers 22. The ends of each membrane 23 are surrounded by potting resin to produce a watertight connection between the outside of the membrane 23 and the headers 22 while keeping the lumens of the hollow fibre membranes 23 in fluid communication with at least one header 22. The rectangular skeins 8 may be oriented in a horizontal plane (FIG. 1B), vertically (FIG. 1C) or horizontally in a vertical plane (FIG. 1D). A plurality of rectangular skeins 8 are typically joined together in a membrane module 20. The spacing between adjacent rectangular skeins 8 in a module 20 is highly exaggerated in FIGS. 1B, 1C and 1D. Typically, adjacent rectangular skeins 8 are separated by a distance equal to or less than the width of the headers 22. For example, the spacing between adjacent rectangular skeins 8 may be 15 cm or less, or 10 cm or less. When the rectangular skeins 8 are oriented vertically as in FIG. 1C, for example, 10 or more vertical skeins 8 may be mounted to a common frame to form a large module 20, sometimes called a cassette. Such a module 20 presents alternating rectangular skeins 8 and vertical gaps between adjacent rectangular skeins 8, the vertical gaps most often being of about the same width as the vertical skeins 8 or less. In some cases, two or more vertical skeins 8 may be joined together as sub-assemblies within the cassette with slots or other means provided, if necessary, between adjacent vertical skeins 8 of the sub-assembly to preserve the vertical gaps between adjacent vertical skeins 8.

Although a single row of hollow fibre membranes 23 is illustrated in each rectangular skein 8, a typical rectangular skein 8 has a mass of hollow fibre membranes 23 between 2 cm and 10 cm wide. The hollow fibre membranes 23 typically have an outside diameter between 0.4 mm and 4.0 mm and are potted at a packing density between 10% and 40%. The hollow fibre membranes 23 are typically between 400 mm and 1,800 mm long and typically mounted with between 0.1% and 5% slack.

Referring again to FIG. 1A, the tank 12 is kept filled with tank water 18 above the level of the membranes 6 in the membrane modules 20 during permeation. Filtered water called permeate 24 flows through the walls of the membranes 6 in the membrane modules 20 under the influence of a transmembrane pressure and collects at the headers 22 to be transported to a permeate outlet 26 through a permeate line 28. The transmembrane pressure is preferably created by a permeate pump 30 which creates a partial vacuum in a permeate line 28. The transmembrane pressure may vary for different membranes and different applications, but is typically between 1 kPa and 150 kPa. Permeate 24 may also be periodically flowed in a reverse direction through the membrane modules 20 to assist in cleaning the membrane modules 20.

During permeation, the membranes 6 reject solids which remain in the tank water 18. These solids may be removed by a number of methods including digestion by microorganisms if the reactor 10 is a bioreactor or draining the tank 12 periodically or by continuously removing a portion of the tank water 18, the latter two methods accomplished by opening a drain valve 32 in a drain conduit 34 at the bottom of the tank.

An aeration system 37 has one or more aerators 38 connected by an air delivery system 40 and a distribution manifold 51 to an air source 42, which is typically one or more air blowers, and produces bubbles 36 in the tank water. The aerators 38 may be of various types including distinct aerators, such as cap aerators, or simply holes drilled in conduits attached to or part of the distribution manifold 51. The bubbles 36 are preferably made of air but may be made of other gasses such as oxygen or oxygen enriched air if required.

The aerators 38 are located generally below the membrane modules 20. If the membrane modules 20 are made of rectangular skeins 8 having vertical hollow fibre membranes 23, the aerators 38 are preferably located to produce bubbles near the edges of the lower headers 22. With rectangular skeins 8 having hollow fibre membranes 23 in a vertical plane, the aerators 38 are preferably located to produce bubbles in a line directly below the vertical plane. With rectangular skeins 8 having hollow fibre membranes 23 in a horizontal plane, the aerators 38 are preferably located to produce bubbles evenly dispersed below the plane.

The bubbles 36 agitate the membranes 6 which inhibits their fouling or cleans them. In addition, the bubbles 36 also decrease the local density of tank water 18 in or near the membrane modules 20 which creates an air-lift effect causing tank water 18 to flow upwards past the membrane modules 20. The air lift effect causes a recirculation pattern 46 in which the tank water 18 flows upwards through the membrane modules 20 and then downwards along the sides or other parts of the tank. The bubbles 36 typically burst at the surface and do not generally follow the tank water 18 through the downward flowing parts of the recirculation pattern 46. The tank water 18 may also flow according to, for example, movement from the inlet 16 to the drain conduit 34, but such flow does not override the flow produced by the bubbles 36.

The bubbles 36 have an average diameter between 0.1 and 50 mm. Individual large bubbles 36 are believed to be more effective in cleaning or inhibiting fouling of the membranes 6, but smaller bubbles 36 are more efficient in transferring oxygen to the tank water 18 and require less energy to produce per bubble 36. Bubbles 36 between 3 mm and 20 mm, and more preferably between 5 mm and 15 mm in diameter, are suitable for use in many wastewater applications. Bubbles 36 in the ranges described immediately above provide effective cleaning of the membranes 6 and acceptable transfer of oxygen to the tank water 18 without causing excessive foaming of the tank water 18 at the surface of the tank 12. If the reactor 10 is used to create potable water or for other applications where oxygen transfer is not required, then bubbles between 5 mm and 25 mm are preferred.

The bubbles 36 may be larger than a hole in an aerator 38 where the bubble 36 is created according to known factors such as air pressure and flow rate and the depth of the aerators 38 below the surface of the tank water 18. If the aerators 38 are located near the bottom of a large tank 12, such as those used in municipal treatment works, an aerator 38 with holes of between 2 mm and 15 mm and preferably between 5 mm and 10 mm might be used. The air pressure supplied (relative to atmospheric pressure) is typically determined by the head of water at the depth of submergence of the aerators 38 (approximately 10 kPa per meter) plus an additional pressure required to get the desired rate of air flow through the aerators 38. There is a typically a pressure drop of between 5 mm and 100 mm of water, and more typically between 10 mm and 50 mm of water, across the holes of the aerators 38. Parts of the aeration system 37 located at a distance below the bottom of the holes of the aerators 38 equal to the pressure drop are generally free of tank water when the air source 42 is operating, although small amounts of tank water 18 may still seep into the aeration system 37.

Cyclic Aeration System

Now referring to FIG. 2, a cyclic aeration system 237 is shown having an air supply 242 in fluid communication with a valve set 254, the valve set 254 controlled by a valve controller 256. The valve set 254 is in fluid communication with an air delivery network 240 having a plurality of distinct branches each in fluid communication with distinct manifolds 251 in fluid communication with conduit aerators 238. Other types of aerators may also be used with suitable modifications to the manifolds 251 or air delivery network. The third branch of the air delivery network 240 and the third manifold 251 are shown in dashed lines to indicate that the number of distinct branches of the air delivery network 240 and manifolds 251 may be two or more, but is not typically more than 15.

The air supply 242 is a source of pressurized air, typically one or more air blowers, and provides a flow of a gas at an initial rate to the cyclic aeration system. The gas is most often air, but may also be oxygen, oxygen or ozone enriched air, or nitrogen in which cases the air supply 242 will include oxygenation or ozonation equipment etc. in addition to an air blower. In this document, however, the term "air" will be used to refer to any appropriate gas. The amount of air provided by the air supply 242 may be determined by summing the amount of air provided to all conduit aerators 238 (to be described below) serviced by the air supply 242. It is preferred that the air supply 242 supply a constant amount of air over time.

The valve set 254 and valve controller 256 will be described in more detail below. In general terms, however, the valve set 254 and valve controller 256 (a) split the air flow from the air supply 242 between the branches of the air delivery network 240 such that, at a point in time, some of the branches receive air at a higher rate of air flow and some of the branches receive air at a lower rate of air flow and (b) switch which branches of the air delivery network 240 receive the higher and lower rates of air flow in repeated cycles.

An example is illustrated in FIG. 3. In each of parts a), b), and c) of FIG. 3, Rh indicates a higher rate of air flow; RI indicates a lower rate of air flow; and, the time from 0 to t3 indicates a cycle which would be repeated. The cycle is divided into three substantially equal time periods, 0 t1; t1–t2; and, t2–t3. In each of these periods, one branch of the air delivery system 240 and its associated manifold 251 receive air at Rh while the others receive air at RI. Similarly, each branch of the air delivery system 240 and its associated manifold 251 receives air at Rh for one third of the cycles and at RI for two thirds of the cycle.

Many of the valves sets 254 to be described below can be used to produce smooth variations in air flow rate to a manifold 251, but it is preferred if the variation is fairly abrupt as suggested by FIG. 3. The inventors have noticed that such an abrupt change produces a short burst of unusually large bubbles 36 which appear to have a significant cleaning or fouling inhibiting effect. The abrupt changes often also produce a spike in air flow rate shortly after the transition from RI to Rh which produces a corresponding pressure surge. This pressure surge must be kept within the design limits of the cyclic aeration system 237 or appropriate blow off valves etc. provided.

The amount of air provided to a manifold 251 or branch of air delivery network 240 is dependant on numerous factors but is preferably related to the superficial velocity of air flow for the conduit aerators 238 services. The superficial velocity of air flow is defined as the rate of air flow to the conduit aerators 238 at standard conditions (1 atmosphere and 25 degrees Celsius) divided by the cross sectional area of aeration. The cross sectional area of aeration is determined by measuring the area effectively aerated by the conduit aerators 238. Superficial velocities of air flow of between 0.013 m/s and 0.15 m/s are preferred at the higher rate (Rh). Air blowers for use in drinking water applications may be sized towards the lower end of the range while air blowers used for waste water applications may be sized near the higher end of the range.

RI is typically less than one half of Rh and is often an air off condition with substantially no flow. Within this range, the lower rate of air flow is influenced by the quality of the feed water 14. An air off condition is generally preferred, but with some feed water 14, the hollow fibre membranes 23 foul significantly even within a short period of aeration at the lower rate. In these cases, better results are obtained when the lower rate of air flow approaches one half of the higher rate. For feed waters in which the rate of fouling is not significant enough to require a positive lower rate of air flow, RI may still be made positive for other reasons. With some aerators or air delivery systems, a positive lower rate of air flow may be desired, for example, to prevent the aerators from becoming flooded with tank water 18 at the lower rate of air flow. While periodic flooding is beneficial in some aerator designs, in others it causes unwanted foulants to accumulate inside the aerator. A positive lower rate of air flow may also be used because of leaks in the valves of the valve set 254 or to reduce stresses on the valve set 254 or the air delivery network 240. Regarding leaks, the lower rate of air flow may typically be as much as about 10%, but more often about 5% or less, of the higher rate of air flow without significantly detracting from the performance achieved with a completely air off condition. Continuing to use valves (which are typically butterfly valves) even after they have developed small leaks decreases the operating expense of the cyclic aeration system 237. Regarding stresses on the valves in the valve set 254 or the air delivery network 240, such stresses can be reduced by purposely not closing the valves entirely. As in the cases of leaks, the lower rate of air flow may be as much as about 10%, but more often about 5% or less, of the higher rate of air flow without significantly detracting from the performance achieved with a completely air off condition.

Figure 4A:
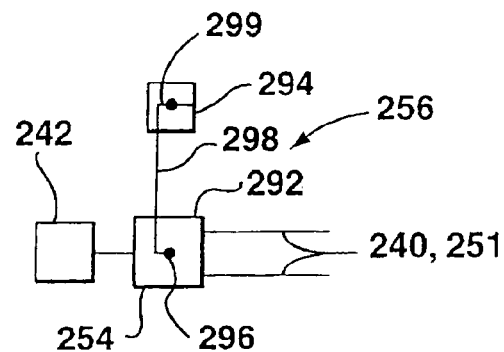
FIGS. 4A, 4B, 4C and 4D are schematic drawings of valve sets and valve controllers according to embodiments of the invention.
Figure 4B:
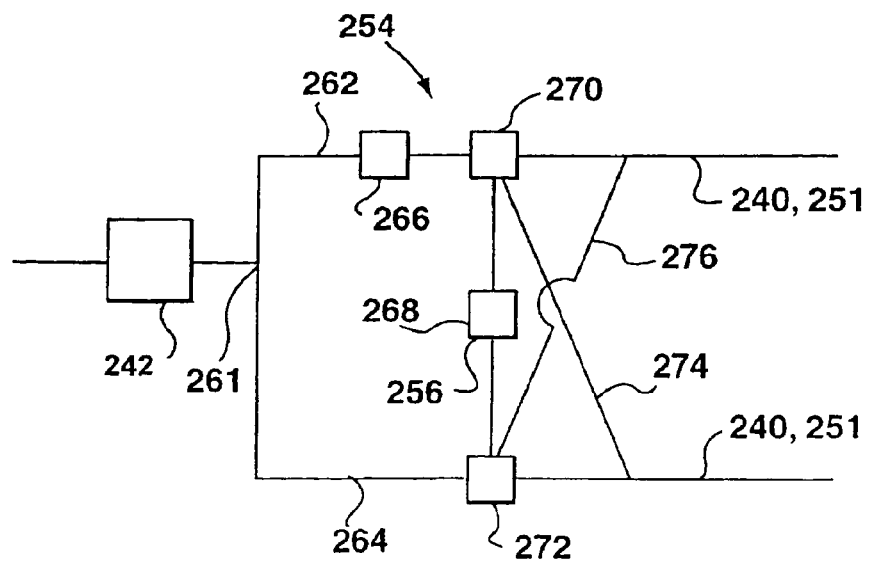
Figure 4C:
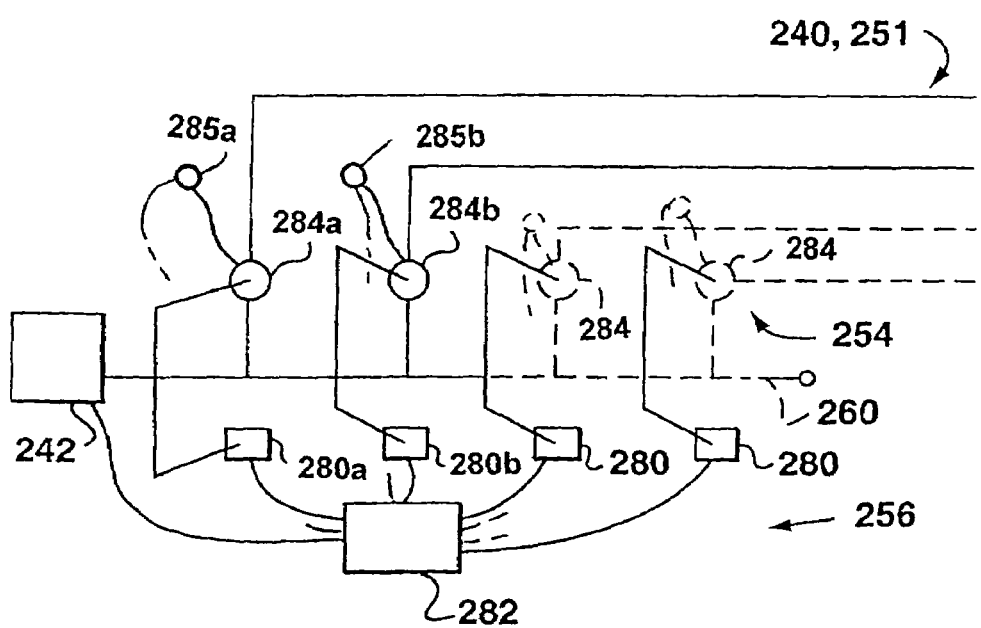

Referring now to FIGS. 4A, 4B and 4C, alternative embodiments of the valve set 254 and valve controller 256 are shown. In FIG. 4A, an air supply 242 blows air into a three way valve 292, preferably a ball valve, with its two remaining orifices connected to two manifolds 251. A three way valve controller 294 alternately opens an air pathway to one of the manifolds 251 and then the other. Preferably there is a phase shift of 180 degrees so that the air pathway to one of the manifolds 251 opens while the airway to the other manifold 251 closes. The three way valve 292 may be mechanically operated by handle 296 connected by connector 298 to a lever 299 on the three way valve controller 294. The three way valve controller 294 may be a drive unit turning at the required speed of rotation of the lever 299. Preferably, however, the three way valve controller 294 is a microprocessor and servo, pneumatic cylinder or solenoid combination which can be more easily configured to abruptly move the three way valve 292.

In FIG. 4B, the air supply 242 blows air into a connector 261 which splits the air flow into a low flow line 262 and a high flow line 264. A valve 266 in the low flow line 262 is adjusted so that flow in the low flow line 262 is preferably less than one half of the flow in the high flow line 264. A controller 268, preferably a timer, a microprocessor or one or more motors with electrical or mechanical links to the valves to be described next, controls a low valve 270, which may be a solenoid valve or a 3 way ball valve, and a high valve 272, which may be a solenoid valve or a 3 way ball valve, so that for a first period of time (a first part of a cycle) air in the low flow line 262 flows to one of the manifolds 251 and air in the high flow line flows to the other manifold 251. For a second period of time (a second part of a cycle), the low valve 270 and high valve 272 are controlled so that air in the low flow line 262 flows to the a manifold 251 through cross conduit 274 and air in the high flow line 264 flows to the other manifold 251 through reverse conduit 276.

In FIG. 4C, air supply 242 blows air into a blower header 260 connected by slave valves 284 to manifolds 251. Each slave valve 284 is controlled by a slave device 280, typically a solenoid, pneumatic or hydraulic cylinder or a servo motor. The slave devices 280 are operated by a slave controller 282 set up to open and close the slave valves 284 in accordance with the system operation described in this section and the embodiments below. The slave controller 282 may be a microprocessor, an electrical circuit, a hydraulic or pneumatic circuit or a mechanical linkage. The slave devices 280 and the slave controller 282 together comprise the valve set controller 256. The valve set controller 256 of FIG. 4C may also be used with the other apparatus of FIG. 4B.

Figure 4D:
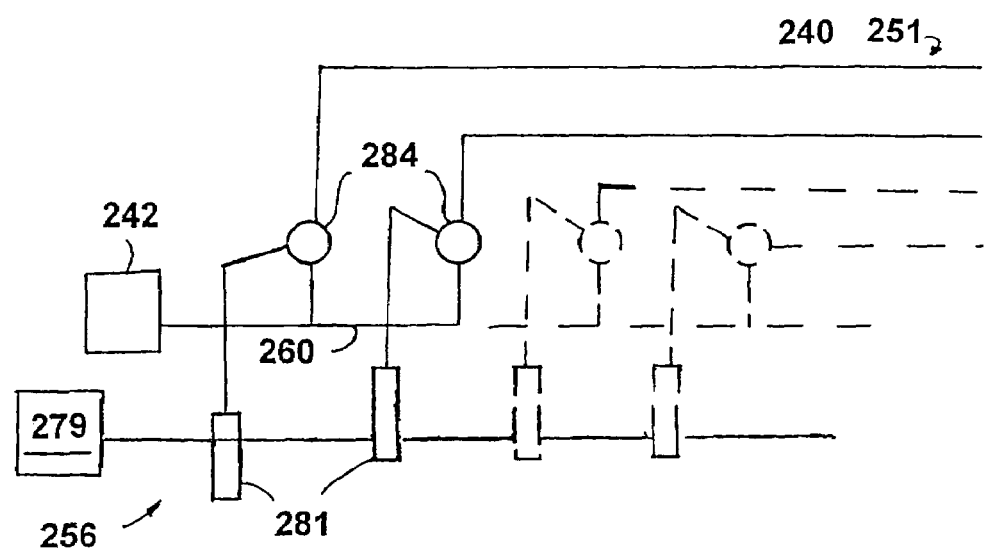

In FIG. 4D, air supply 242 blows air into a blower header 260 connected by slave valves 284 to manifolds 251. Each slave valve 284 is controlled by a valve set controller 256 which consists of a plurality of cams 281, driven by a motor 279. The cams 281 may drive the slave valves 284 directly (as illustrated) or control another device, such as a pneumatic cylinder, which directly opens or closes the slave valves 284. The shape of the cams 281 is chosen to open and close the slave valves 284 in accordance with the system operation described in this section and the embodiments below. The valve set controller 256 of FIG. 4D may also be used with the other apparatus of FIG. 4B.

With the apparatus of FIG. 4B, 4C or 4D, the opening and closing times of the slave valves 284 are mechanically (preferably by a pneumatic circuit) or electrically (preferably with a programmable logic controller—PLC) interconnected such that each slave valve 284 either opens or closes, or both, automatically with or in response to the opening or closing of a slave valve or slave valves 284 in another distinct branch of the air delivery network 240. This occurs naturally, for example, in the embodiment of FIG. 4D by virtue of the cams 281 being linked to a common motor 279. If the motor 279 fails or turns at an improper speed, the opening and closing times of the slave valves 284 relative to each other is preserved. Where the valve set controller 256 incorporates a slave controller 282, the slave controller 282 may incorporate a timer, but preferably does not open and close slave valves 284 based solely on inputs from the timer. For example, an acceptable set up for the slave controller 282 is to have the opening of the slave valves 284 of a distinct branch determined by time elapsed since those slave valves 284 were closed, but the closing of those slave valves 284 is determined by the slave valves 284 of another distinct branch having opened to a selected degree.

The opening and closing movements of the slave valves 284 are preferably overlapped to minimize the spike in air flow rate and pressure surge shortly after the transition from RI to Rh mentioned above. Preferably, the opening and closing times of the slave valves 284 are arranged such that the slave valve or valves 284 to any distinct branch of the air delivery network 240 do not start to close until the slave valve or valves 284 to any other distinct branch of the air delivery system 240 are fully open. Further preferably, where the valve set controller 256 includes a slave controller 282, position sensors are fitted to the slave valves 284. The slave controller 282 is configured such that the failure of a slave valve or valves 284 to open as desired prevents the closure of the slave valve or valves 284 of another distinct branch of the air delivery network 240. In this way, in addition to minimizing and possibly substantially eliminating any spike in air flow, damage to the cyclic aeration system 237 is avoided if the slave valve or valves 284 to a distinct branch of the air delivery network 240 fail to open.

Figure 4E:
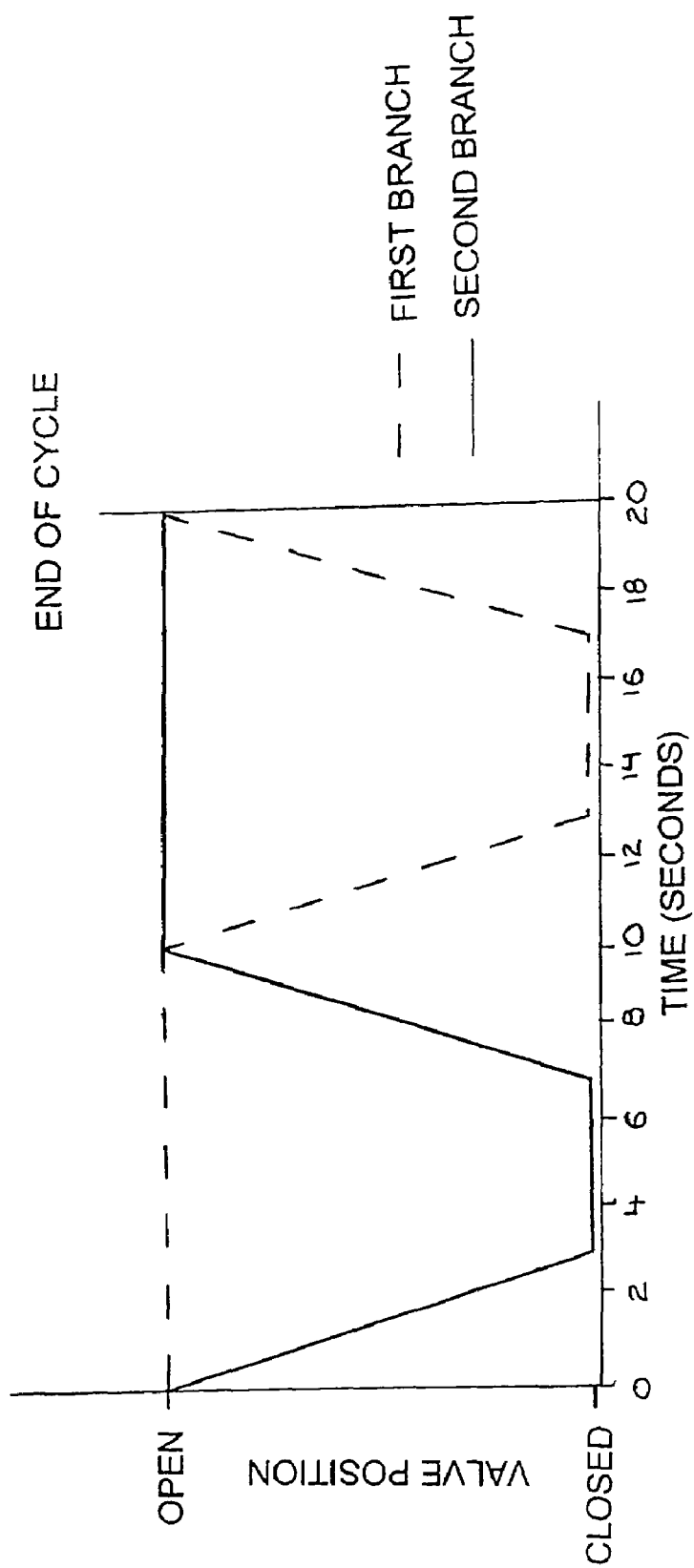
FIGS. 4E and 4F are diagrams of valve position over time.
Figure 4F:
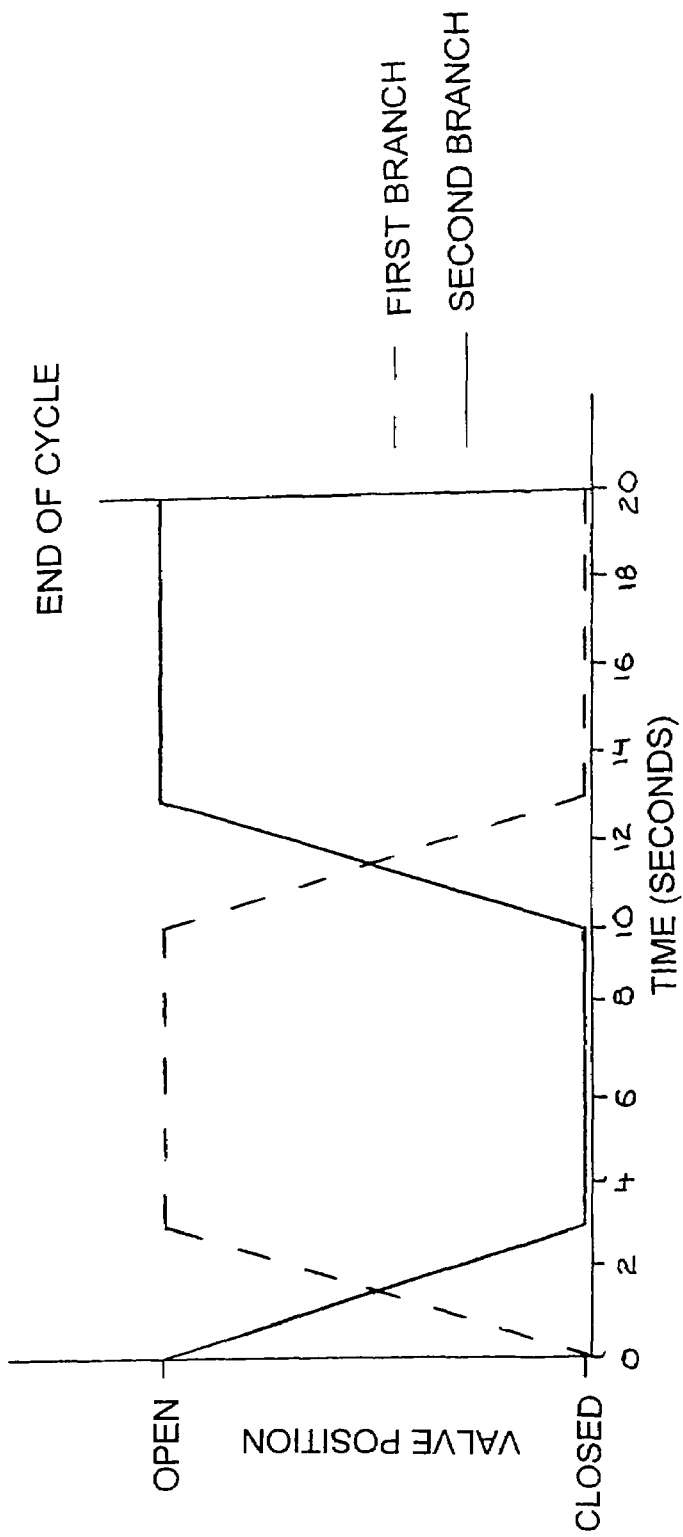

Despite the concern for controlling any spikes in air flow rate or pressure, the overall goal of the valve set controller 256 is to produce rapid changes between RI and Rh. The time required to open or close (partially or fully as desired) a slave valve 284 from its closed (fully or partially) or opened position respectively is preferably less than about 5 seconds and more preferably less than about 3 seconds when used with very short cycle times of 40 seconds or less. For example, FIGS. 4E and 4F show suitable slave valve 284 positions over time for an air distribution network 240 having two distinct branches where RI is an air off condition, the cycle time is 20 seconds and the valve opening time is 3 seconds. In FIG. 4E, the start of the closing times of the slave valves 284 are interconnected such that each slave valve 284 begins to close when the other is fully open. In FIG. 4F, the start of the closing times of the slave valves 284 are interconnected such that each slave valve 284 begins to close when the other begins to open. In either case, where a positive RI is desired, the fully closed position of the slave valves 284 illustrated can be replaced by a partially closed position, or the apparatus of FIG. 4B can be used.

As an example of the interconnection of slave valves 284 described above, the regime of FIG. 4E will be discussed further below. Referring again to FIG. 4C, two manifolds 251 are controlled by two slave valves, 284a and 284b, through two slave devices, 280a and 280b. Each slave valve 284 has a limit switch 285 which provides a signal to the slave controller 282 indicating whether that slave valve 284 is open or at a desired partially or fully closed setting. Where the slave controller 282 is a PLC and the slave devices 280 are servo motors or pneumatic cylinders, the following PLC programming control narrative can be used to obtain air cycling as described in relation to FIG. 4E:

1. At start-up, slave controller 282 sends a signal to slave devices 280a and 280b to open slave valve 284a and close slave valve 284b respectively.

2. After 3 seconds, slave controller 282 checks for an "open" signal from limit switch 285a and a "closed" signal from limit switch 285b.

3. If both valves are confirmed in their correct positions, slave controller 282 sends a signal to start blower 242.

4. Seven seconds after the blower 242 is started, slave controller 282 sends a signal to slave device 280b to open slave valve 284b.

5. Three seconds after the preceding step, slave controller 282 checks for an "open" signal from limit switch 285b; if an "open" signal is received, proceed to step 6; if an "open" signal is not received, sound alarm and go to a continuous aeration mode, for example, by operating bypass valves to provide air to all manifolds 251 direct from the blower 242.

6. Slave controller 282 sends a signal to slave device 280a to close slave valve 284a.

7. Three seconds after step 6, slave controller 282 checks for a "closed" signal from limit switch 285a; if a "closed" signal is received, proceed with step 8; if a "closed" signal is not received, sound alarm and go to a continuous aeration mode.

8. Four seconds after step 7, slave controller 282 sends a signal to slave device 280a to open slave valve 284a.

9. Three seconds after step 4, slave controller 282 checks for an "open" signal from limit switch 285a; if an "open"

signal is received, proceed with step 10; if an "open" signal is not received, sound alarm and go to a continuous aeration mode.

10. Slave controller 282 sends a signal to slave device 280b to close slave valve 284b.

11. Three seconds after step 10, slave controller 282 checks for a "closed" signal from limit switch 285b; if a "closed" signal is received, proceed with step 12; if a "closed" signal is not received, sound alarm and go to a continuous aeration mode.

12. Four seconds after step 11, slave controller 282 sends signal to slave device 280b to open slave valve 284b.

13. Repeat steps 5–12 until unit is shut down or other control regime activated.

The regime of FIG. 4E provides the advantage discussed above of having at least one distinct branch of the air delivery network 240 fully open at all times but the total time for the transition between RI to Rh is extended to twice the valve opening time. This method is preferred for cycle times of 20 seconds or more. The regime of FIG. 4F produces a faster transition from RI to Rh but at the risk of over stressing the cyclic aeration system 237 if the valve or valves 262 to a distinct branch start to open but then fail to open completely. This risk must be addressed with other system fail safes known in the art. The regime of FIG. 4F is preferred for cycle time less than 20 seconds and when valve opening/closing times are greater than about 3 seconds. Modifications to the narrative above can be used to produce other regimes of air cycling. The regimes of FIGS. 4E and 4F and others can also be extended to cyclic aeration systems with more than two distinct branches.

Use of Cyclic Aeration to Provide Efficient Intermittent Aeration

Figure 5:
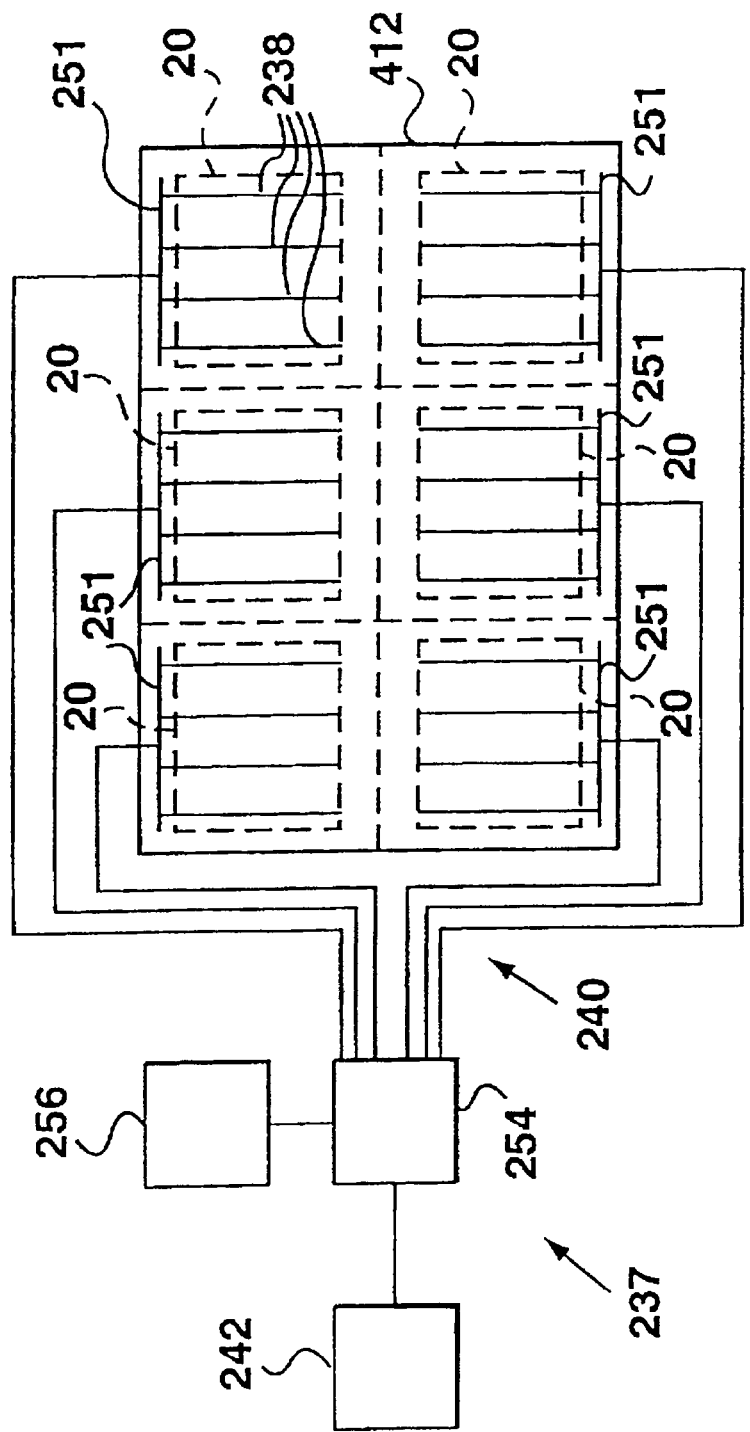
FIG. 5 is a plan view schematic of membrane modules and an aeration system according to an embodiment of the invention.

Use of the cyclic aeration system 237 to provide efficient intermittent aeration will now be described with reference to the following embodiment, it being understood that the invention is not limited to the embodiment. Referring to FIG. 5, an aeration system 237 is shown for use in providing intermittent aeration to six membrane modules 20 (shown with dashed lines) in a filtration tank 412. The filtration tank 412 has six filtration zones (also shown with dashed lines) corresponding to the six membrane modules 20. Alternately, the filtration zones could be provided in separate tanks with one or more membrane modules 20 in each tank. The membrane modules 20 will be used to filter a relatively foulant free surface water such that intermittent aeration is suitable.

The air delivery network 240 has six distinct branches each connected to a header 251 in a filtration zone. Each header 251 is in turn connected to conduit aerators 238 mounted generally below the membrane modules 20. The valve set 254 and valve controller 256 are configured and operated to provide air from the air supply 242 to the air delivery network 240 in a 7.5 minute cycle in which air at the higher rate is supplied for about 75 seconds to each branch of the air delivery network 240 in turn. While a branch of the air delivery network 240 is not receiving air at the higher rate, it receives air at the lower rate. Accordingly, each header 251 receives air at the higher rate for 75 seconds out of every 7.5 minutes. Operation of the air supply 242, however, is constant and an air supply sized for one manifold 251 is used to service six such manifolds.

It is preferable if backwashing of the membrane modules 20 is also performed on the membrane modules in turn such that backwashing of a membrane module 20 occurs while the membrane module 20 is being aerated. The membrane modules 20 can be backwashed most easily when each membrane module 20 is serviced by its own permeate pump 30 and associated backwashing apparatus. In large municipal systems, for example, the permeation and backwashing apparatus are typically limited to about 8 to 11 ML/d capacity. Accordingly a medium size plant (ie. in the range of 40 ML/d) will have several membrane modules 20 serviced by sets of permeation and backwashing apparatus which can be individually controlled. In some plants, backwashing is performed on the membrane modules 20 in turn to produce an even supply of permeate 24 regardless of aeration.

In a pilot study conducted with feed water having turbidity of 0.3 NTU and colour of 3.9 TCU, for example, the inventors were able to achieve acceptable sustained permeability of a membrane module using 75 seconds of aeration at a higher rate of 0.035 m/s superficial velocity every 15 minutes and 15 seconds. For the remainder of the cycle there was no aeration. Each cycle involved 15 minutes of permeation through the membrane modules 20 and 15 seconds of backwashing. The 75 seconds of aeration was timed so that there was 30 seconds of aeration before the backpulse, aeration during the backpulse, and 30 seconds of aeration after the backpulse. The test suggests that if cycled aeration is timed to coincide for each manifold 251 with the backwashing of the associated membrane module 20, then about 12 membrane modules 20 could be serviced by a single air supply 242 as part of the cyclic aeration system 237.

Use of Cyclic Aeration to Provide Intense Aeration

Figure 6:
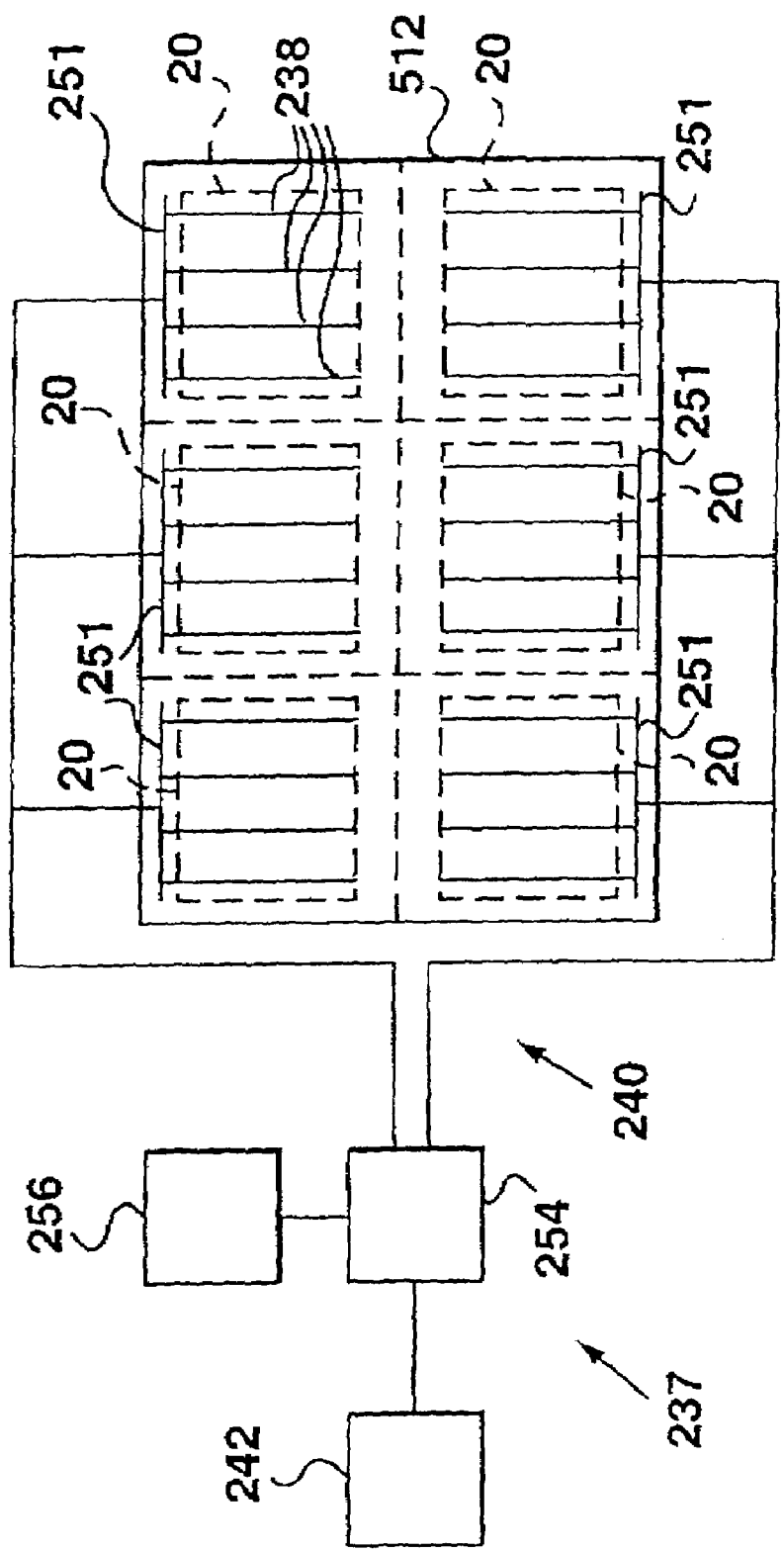
FIG. 6 is a plan view schematic of membrane modules and an aeration system according to an embodiment of the invention.

Use of the cyclic aeration system 237 to provide intense aeration will now be described with reference to the following embodiment, it being understood that the invention is not limited to the embodiment. Referring to FIG. 6, an aeration system 237 is shown for use in providing aeration alternating between a plurality of sets of membrane modules 20 (shown with dashed lines) in a filtration vessel 512. The filtration vessel 512 has at least two filtration zones (also shown with dashed lines) corresponding to the at least two sets of membrane modules 20. Alternately, the filtration zones could be provided in separate tanks with one or more membrane modules 20 in each tank. The membrane modules 20 will be used to filter a relatively foulant rich surface water or a wastewater such that intense aeration is suitable.

The air delivery network 240 has at least two distinct branches each connected to headers 251 in a filtration zone. Each header 251 is in turn connected to conduit aerators 238 mounted generally below the membrane modules 20. The valve set 254 and valve controller 256 are configured and operated to provide air from the air supply 242 to the air delivery network 240 in a short cycle in which air at the higher rate is supplied for one part, for example one fifth to one half, of the cycle to each branch of the air delivery network 240. While a branch of the air delivery network 240 is not receiving air at the higher rate, it receives air at the lower rate.

The preferred total cycle time may vary with the depth of the filtration vessel 512, the design of the membrane modules 20, process parameters and the conditions of the feed water 14 to be treated, but may be at least 10 seconds (5 seconds at the full rate and 5 seconds at the reduced rate) where the filtration vessel 512 is a typical municipal tank between 1 m and 10 m deep. The cycle time may also be at least 15 seconds or at least 20 seconds. A cycle time of up to 120 seconds (60 seconds at the full rate, 60 seconds at the reduced rate) may be effective, but preferably the cycle time does not exceed 60 seconds (30 seconds at the full rate, 30 seconds at the reduced rate) where the filtration vessel 512 is a typical municipal tank.

The inventors believe that such rapid cycling creates transient flow within the tank water 18. In particular, an air lift effect is created or strengthened when the rate of airflow changes from RI to Rh causing the tank water 18 to accelerate. Shortly afterwards, however, aeration and the air lift effect are sharply reduced causing the tank water 18 to decelerate. With very short cycles, the tank water 18 is accelerating or decelerating for much of the cycle and is rarely in a steady state. It is believed that formation of quiescent zones in the tank water 18 is inhibited and that beneficial movement of the hollow fibre membranes 23 is enhanced. For example, horizontal hollow fibre membranes 23, as shown in the rectangular skeins 8 of FIGS. 1B and 1D, assume a generally concave downward shape under steady state aeration and experience limited movement at their ends. With cyclic aeration as described above, however, tension in the hollow fibre membranes 23 is released cyclically and, in some cases, local currents which flow downward may be created for brief periods of time. The ends of the horizontal hollow fibre membranes 23 experience more beneficial movement and foul less rapidly. Since the beneficial effects may be linked to creating transient flow, it is also believed that factors which effect acceleration of the water column above a set of conduit aerators 238, such as tank depth or shrouding, could modify the preferred cycle times stated above.

Use of Cyclic Aeration to Promote Horizontal Flow

Figure 7A:
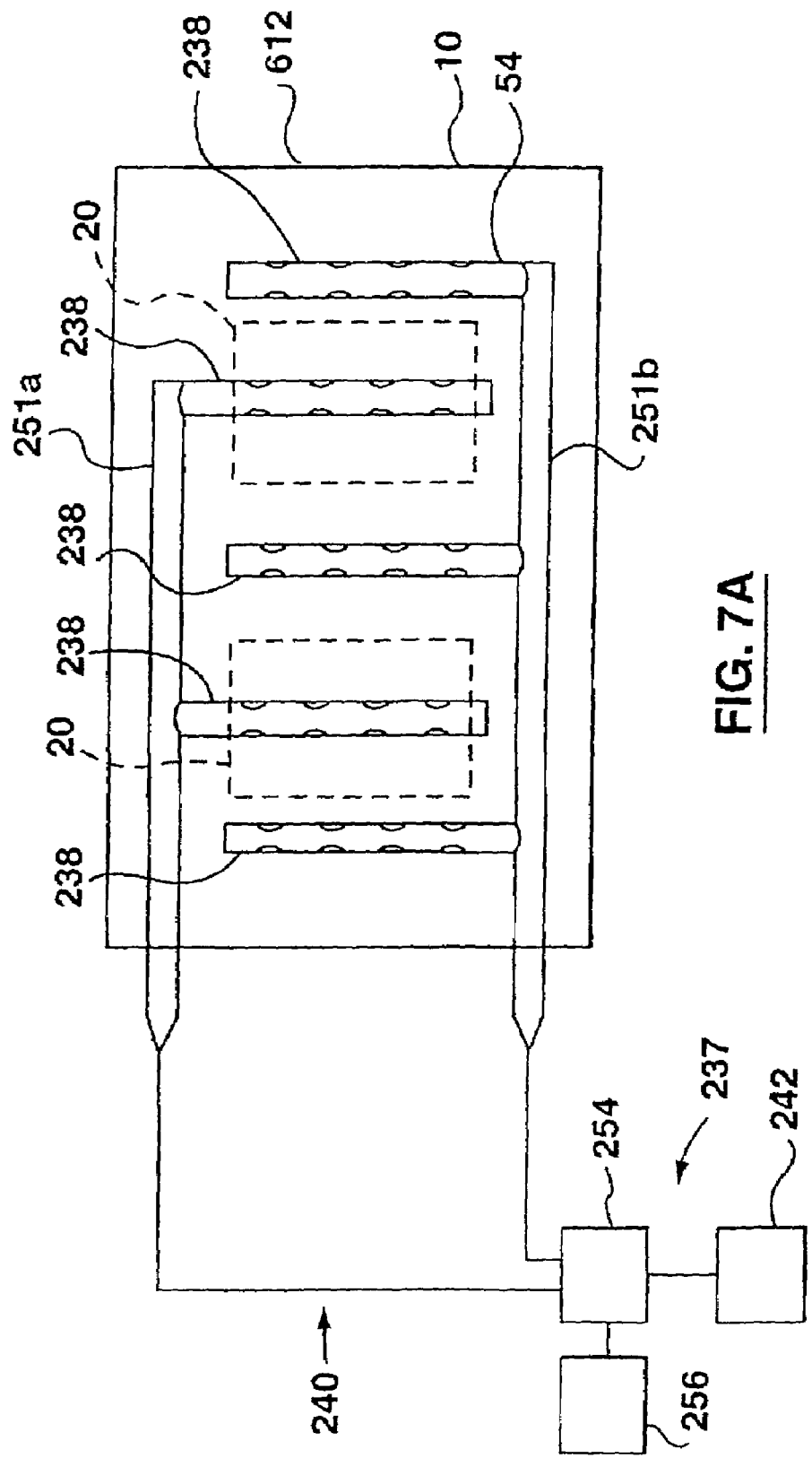
FIG. 7A is a plan view schematic of membrane modules and an aeration system according to an embodiment of the invention.

Use of the cyclic aeration system 237 to promote horizontal flow in the tank water 18 will now be described with reference to the following embodiment, it being understood that the invention is not limited to the embodiment. Referring to FIG. 7A, an aeration system 237 is shown for use in aerating membrane modules 20 in a process tank 612. The membrane modules 20 will be used to filter a relatively foulant rich surface water or a wastewater such that intense aeration is suitable.

Figure 7C:
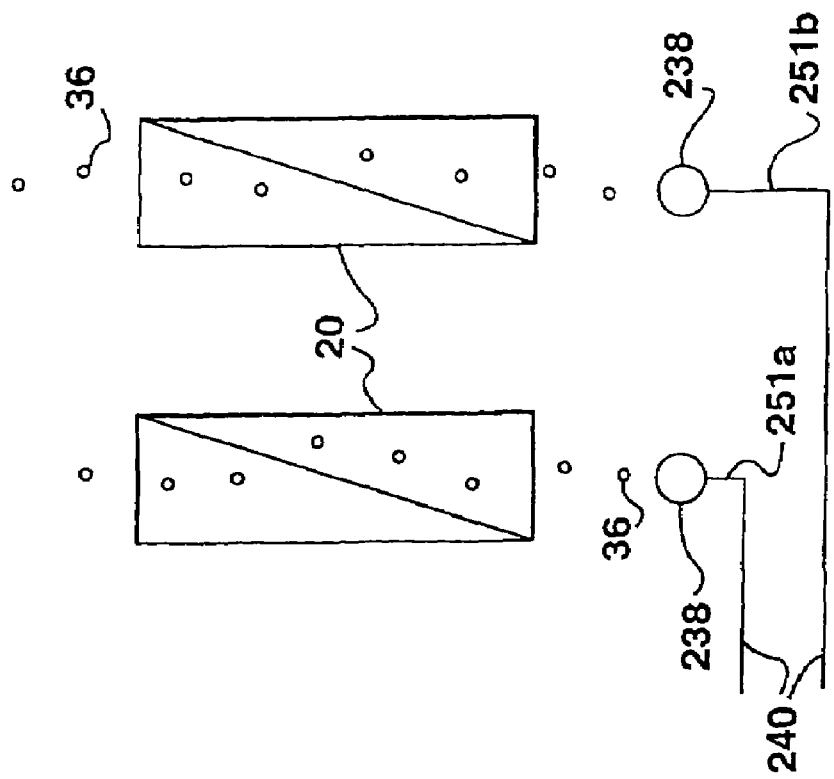
FIGS. 7B, 7C and 7D are elevational representations of membrane modules and parts of an aeration system according to alternatives to the embodiment of FIG. 7A.
Figure 7B:
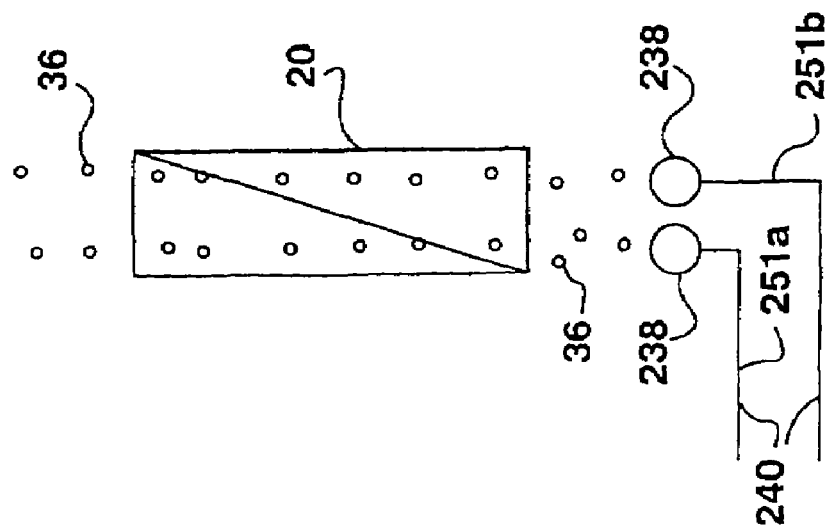
Figure 7D:
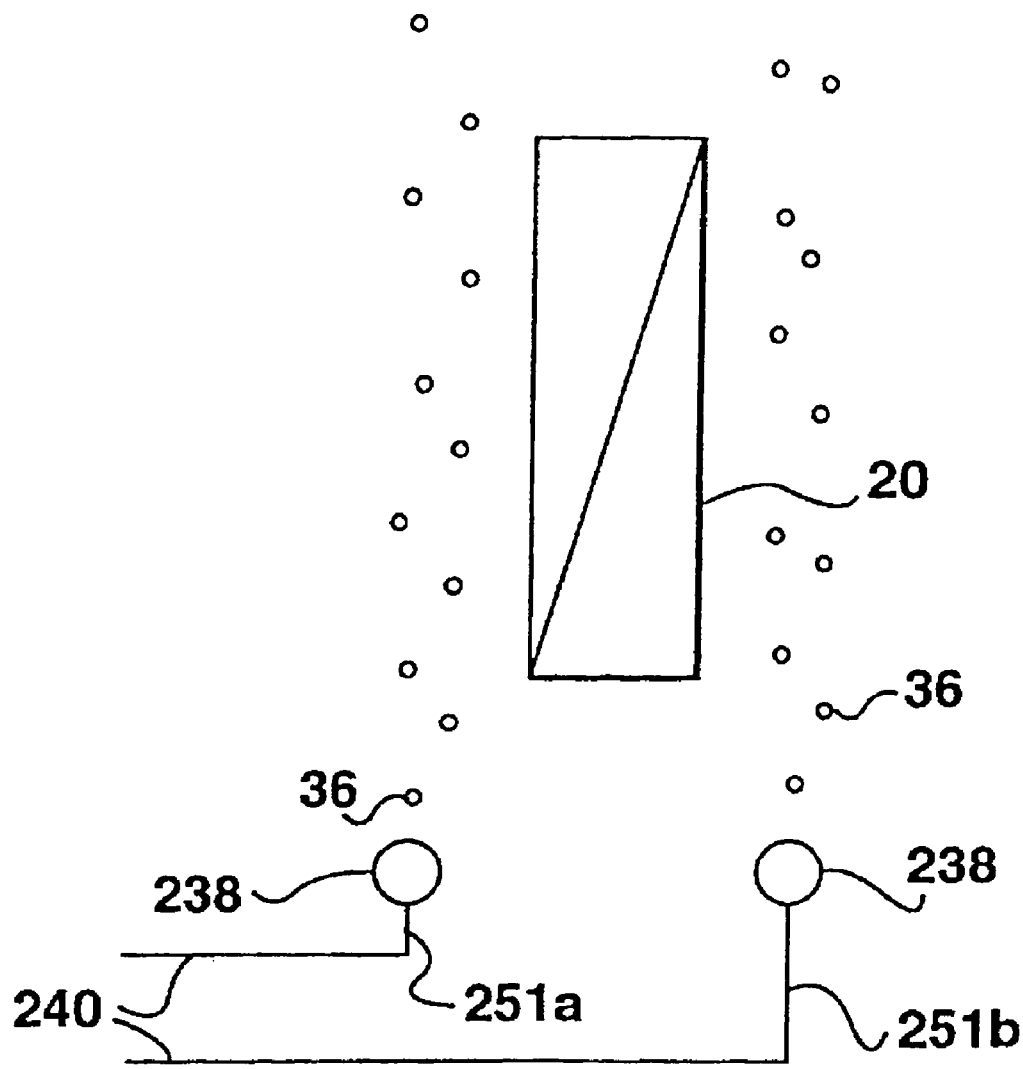

The air delivery network 240 has at least two distinct branches 241 (two being shown), each connected to a distinct header 251, and all being located in a single filtration zone. The headers 251 will be referred to as header 251a and 251b where convenient to distinguish between them. Headers 251 are connected to conduit aerators 238 such that the conduit aerators 238 attached to header 251a are interspersed with the conduit aerators 238 attached to header 251b. One such arrangement is shown in FIG. 7A in which header 251a is connected to conduit aerators 238 directly beneath the membrane modules 20 while header 251b is connected to horizontally displaced conduit aerators 238 located beneath and between the membrane modules 20. Referring now to FIGS. 7B, 7C and 7D, a set of variations of the embodiment of FIG. 7A is shown. In FIG. 7B, header 251a and header 251b are connected to alternating horizontally displaced conduit aerators 238 located beneath the membrane modules 20. In FIG. 7C, header 251a and header 251b are connected to alternating horizontally displaced conduit aerators 238 located directly beneath alternating membrane modules 20. In FIG. 7C, header 251a and header 251b are connected to alternating horizontally displaced conduit aerators 238 located directly beneath and between alternating membrane modules 20. In each of these cases, the pattern may be repeated where more membrane modules 20 are used. In all of the cases of FIGS. 7A, 7B, 7C and 7D, the modules 20 may be made small enough so that they are not each a separate filtration zone and the cyclic aeration system 240 can cause horizontal flow in them. For example, each module 20 may be made of 1 to 4, or 1 to 2, rectangular skeins 8 oriented as in FIG. 1C. Similar patterns may also be used where the air delivery network 240 has more than two distinct branches 241.

Each of header 251a and header 251b are connected to a distinct branch of the air delivery network 240 and in turn connected to a valve set 254. The valve set 254 and a valve controller 256 are configured and operated to provide air from an air supply 242 to the air delivery network 240 in a short cycle in which air at a higher rate is supplied for one part, for example one fifth to one half, of the cycle to each branch of the air delivery network 240. All of the distinct branches 241 of the air delivery network 240 may be provided with air at the higher rate for about the same length of time within each cycle. While a branch of the air delivery network 240 is not receiving air at the higher rate, it receives air at the lower rate. The lower flow rate is preferably one half or less of the higher flow rate and, where conditions allow it, the lower flow rate is preferably an air-off condition.

The total cycle time may vary with the depth of the process tank 612, the design of the membrane modules 20, process parameters and the conditions of the feed water 14 to be treated, but typically is at least 2 seconds (1 second at the full rate and 1 second at the reduced rate), preferably 10 seconds or more, optionally 15 seconds or more, and less than 120 seconds (60 seconds at the full rate, 60 seconds at the reduced rate), preferably less 60 seconds, where the process tank 612 is a typical municipal tank between 1 m and 10 m deep. More preferably, however, the cycle time is between 20 seconds and 40 seconds in length. Short cycles of 10 seconds or less may not be sufficient to establish regions of different densities in the tank water 18 in a deep tank 12 where such time is insufficient to allow the bubbles 36 to rise through a significant distance relative to the depth of the tank 12. Long cycles of 120 seconds or more may result in parts of a membrane module 20 not receiving bubbles 36 for extended periods of time which can result in rapid fouling. As discussed above, the beneficial effects of the invention may be linked to creating transient flow and it is believed that factors which effect acceleration of the water column above a set of conduit aerators 238, such as tank depth or shrouding, could modify the preferred cycle times stated above.

In this embodiment, having the conduit aerators 238 connected to header 251a interspersed with the conduit aerators 238 attached to header 251b creates varying areas of higher and lower density in the tank water 18 within a filtration zone. As described above, the inventors believe that these variations produce transient flow in the tank water 18. Where the effective areas of aeration above conduit aerators 238 attached to distinct branches of the air delivery network 240 are sufficiently small, however, the inventors believe that appreciable transient flow is created in a horizontal direction between areas above conduit aerators 238 attached to different branches of the air delivery network 240. Referring to FIGS. 7A, 7B, 7C, 7D the membrane modules 20 shown are preferably of the size of one or two rectangular skeins 8.

Figure 8A:
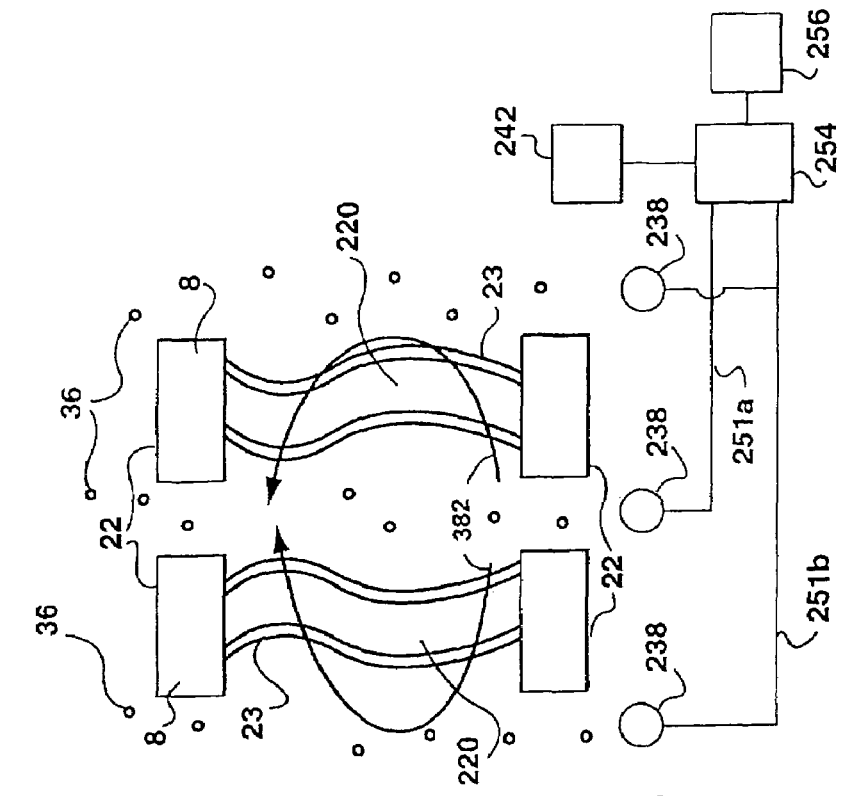
FIGS. 8A and 8B are elevational representations of membrane modules and parts of an aeration system according to an embodiment of the invention under the influence of a cyclic aeration system.
Figure 8B:
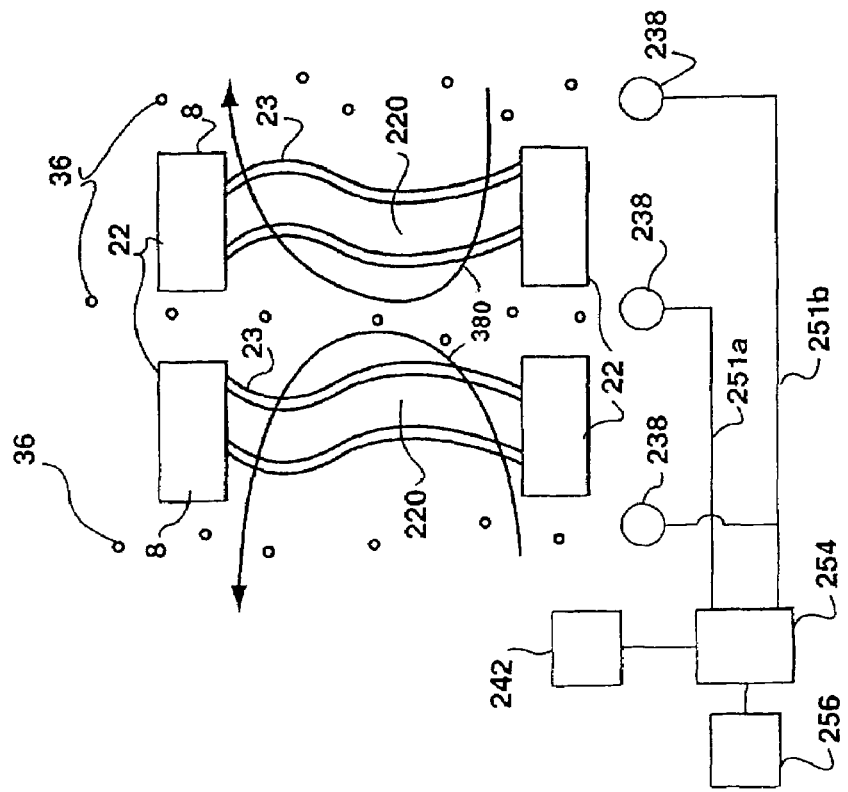

As an example, in FIGS. 8A and 8B second membrane modules 220 each made of a single rectangular skein 8 with hollow fibre membranes 23 oriented vertically aerated by a cyclic aeration system 237 with conduit aerators 238 located relative to the second membrane modules 220 as shown in FIG. 7D. In FIGS. 8A and 8B, the degree of slack of the hollow fibre membranes 23 is highly exaggerated for easier illustration. Further, only two hollow fibre membranes 23 are illustrated for each vertical rectangular skein 8 although, as discussed above, a rectangular skein 8 would actually be constructed of many hollow fibre membranes 23.

With steady state aeration, it is difficult to encourage bubbles 36 to penetrate the vertical rectangular skeins 8. The natural tendency of the bubbles 36 is to go through the areas with lowest resistance such as around the second membrane modules 220 or through slots between the second membrane modules 220 and the hollow fibre membranes 23 on the outer edge of the vertical rectangular skeins 8 may have significantly more contact with the bubbles 36. Further, the upper 10 20% of the hollow fibre membranes 23 is often forced into a tightly curved shape by the air lift effect and moves only very little. A smaller portion at the bottom of the hollow fibre membranes 23 may also be tightly curved by the current travelling around the lower header 22. In these tightly curved areas, the hollow fibre membranes 23 foul more rapidly.

With cyclic aeration, however, air at the higher rate is alternated between header 251a and header 251b. When more air is supplied to header 251a, the hollow fibre membranes 23 assume an average shape as shown in FIG. 8A with a first local recirculation pattern 380 as shown. When more air is supplied to header 251b, the hollow fibre membranes 23 assume an average shape as shown in FIG. 8B with a second local recirculation pattern 382 as shown. Under the influence of a cyclic aeration system 237, the hollow fibre membranes 23 alternate between the positions shown in FIGS. 8A and 8B. Accordingly, the portion of the hollow fibre membranes 23 which moves only very little is decreased in size. The cycling also creates a reversing flow into and out of the vertical rectangular skeins 8 which the inventors believe encourages bubbles 36 to penetrate deeper into the vertical rectangular skeins 8.

In cyclic aeration systems having more than two distinct branches, there are correspondingly more than two headers 251 to which air at the higher flow rate may alternately be supplied. For example, in the embodiment of FIG. 7E, a cyclic aeration system 437 has 4 distinct branches 241 in air delivery network 240. Other numbers of distinct branches 241, for example 3 or 5 or 6, may also be used. Each distinct branch 241 is in fluid communication with a unique one of four headers 251a, 251b, 251c, 251d.

Figure 7E:
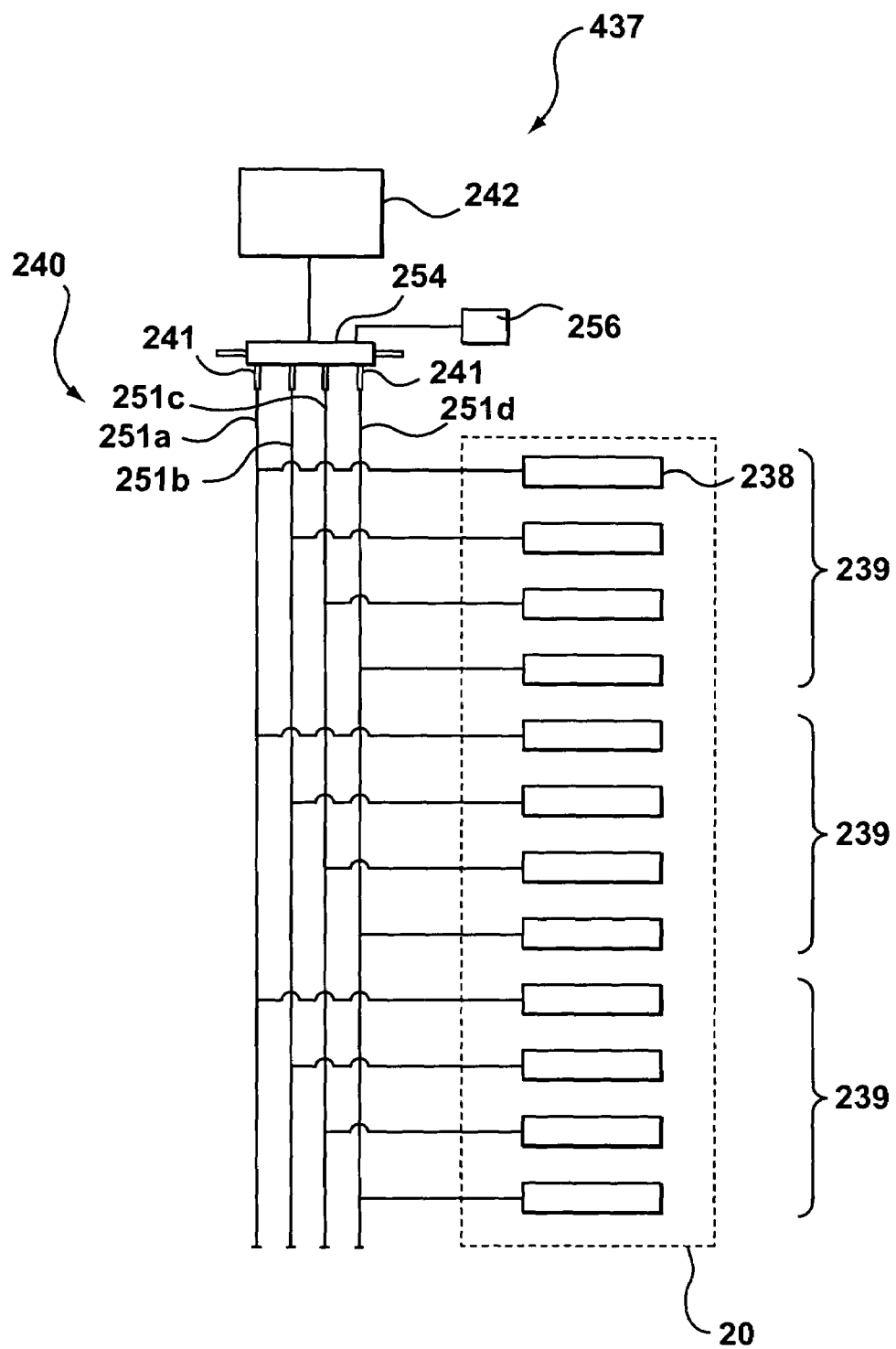
FIGS. 7E, 7F and 7G are schematic representations (7E and 7G) and an isometric view of an embodiment of the invention.
Figure 7F:
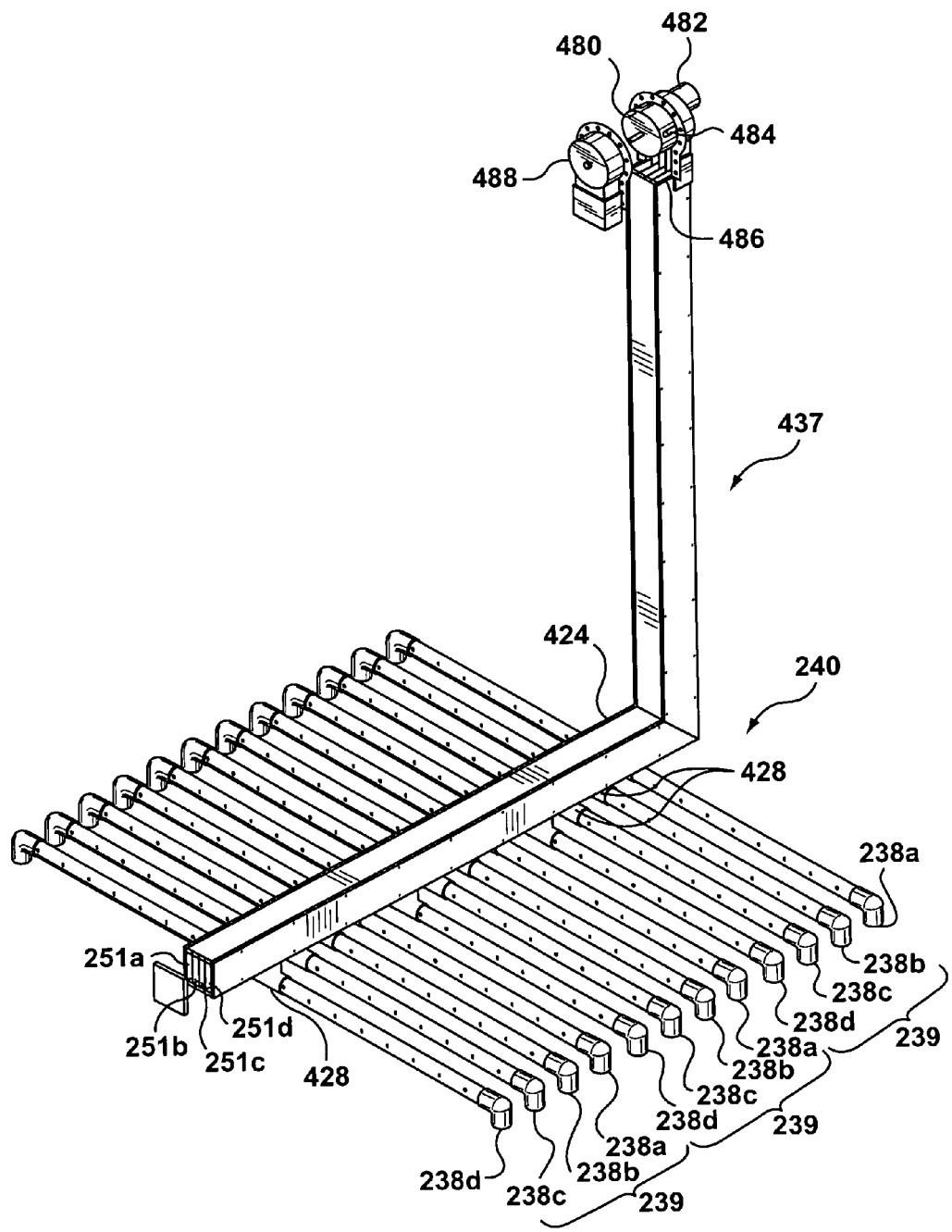

Cyclic aeration system 437 of FIG. 7E further has three aerators 238 in fluid communication with each of the four headers 251, providing a total of 12 aerators 238. Other numbers of aerators 238 may also be used with each header 251. The 12 aerators 238 are arranged in three sets 239, so that each set 239 has four aerators 238. Within set 239, the four aerators 238 are each in fluid communication with a unique one of the four headers 251a, 251b, 251c, 251d. Referring now to FIG. 7F, one optional physical arrangement of elements of air delivery network 248 of aeration system 437 includes a tubular channel 424 segregated by elongate ribs 426 to provide four distinct branches 241 and headers 251. The four distinct headers 251 within channel 424 are identified as 251a, 251b, 251c, and 251d. Aerators 238 may be disposed in a longitudinal plane below channel 424, and arranged perpindicular to channel 424. Each aerator 238 may be provided with a connection fitting 428 disposed between channel 424 and aerator 238. Aerators 238 may be provided on either side of the channels 424. The aerators 238 on each side may collectively service a module 20 of many rectangular skeins 8 or a module 20 may be located over all of the aerators 238 associated with the cyclic aeration system 437. Connection fittings 428 may be connected to a particular point along the width of channel 424 so that the aerator 238 to which a particular connection fitting 428 is attached is in fluid communication with a particular one of the four distinct headers 251. In this way, aerators 238 may be provided in sets 239, in which each set 239 has one aerator 238 associated with one distinct header 251. Aerators 238 in fluid communication with distinct headers 251a, 251b, 251c, 251d have been identified as aerators 238a, 238b, 238c, 238d, respectively.

Referring again to FIG. 7E, valve set 254 is controlled by valve set controller 256 so that air at a high flow rate supplied by air supply 242 is alternately supplied to headers 251a, 251b, 251c, 251d. This provides a repeated cycle in which a high flow rate of air is first provided to first aerators 238a in each set 239, then to second aerators 238b, next to third aerators 238c, and finally to fourth aerators 238d of each set 239. Other repeated cycles may also be used, although the inventors believe that providing air sequentially to adjacent aerators below a group of adjacent rectangular skein 8 provides strong horizontal flow through a module 20.

The aerators 238 associated with any one branch 241 receive air at the high flow rate for about ¼ of the total time to complete one cycle, and at the low flow rate for about ¾ of the total cycle time. It has been determined that favourable results are obtained by supplying each branch 241 of the air delivery network 240 with air at the high flow rate for about 4 to 15 seconds each cycle, resulting in a total cycle time of about 15–60 seconds.

The valve set 254 may comprise 4 valves, wherein one valve controls flow through a single distinct branch 241 of the air delivery network 240, as described in previous embodiments. Referring to FIG. 7F, a rotating valve comprising a drum 480 fed with air through a drum inlet 482 having slots 484 correspondable with openings 486 in the headers 251 and enclosed in an outer cylinder 488, may also be used. The circumference of the drum 480 approximates a whole number multiple of the total width of all the channels 424 and the width of the slots 484, as measured around the circumference, approximates the width of a single channel 424. In this way, air in the drum 480 is always in communication with at least one channel 424 and air is provided sequentially to the channels 424 in a repeated A, B, C, D pattern.

Figure 7G:
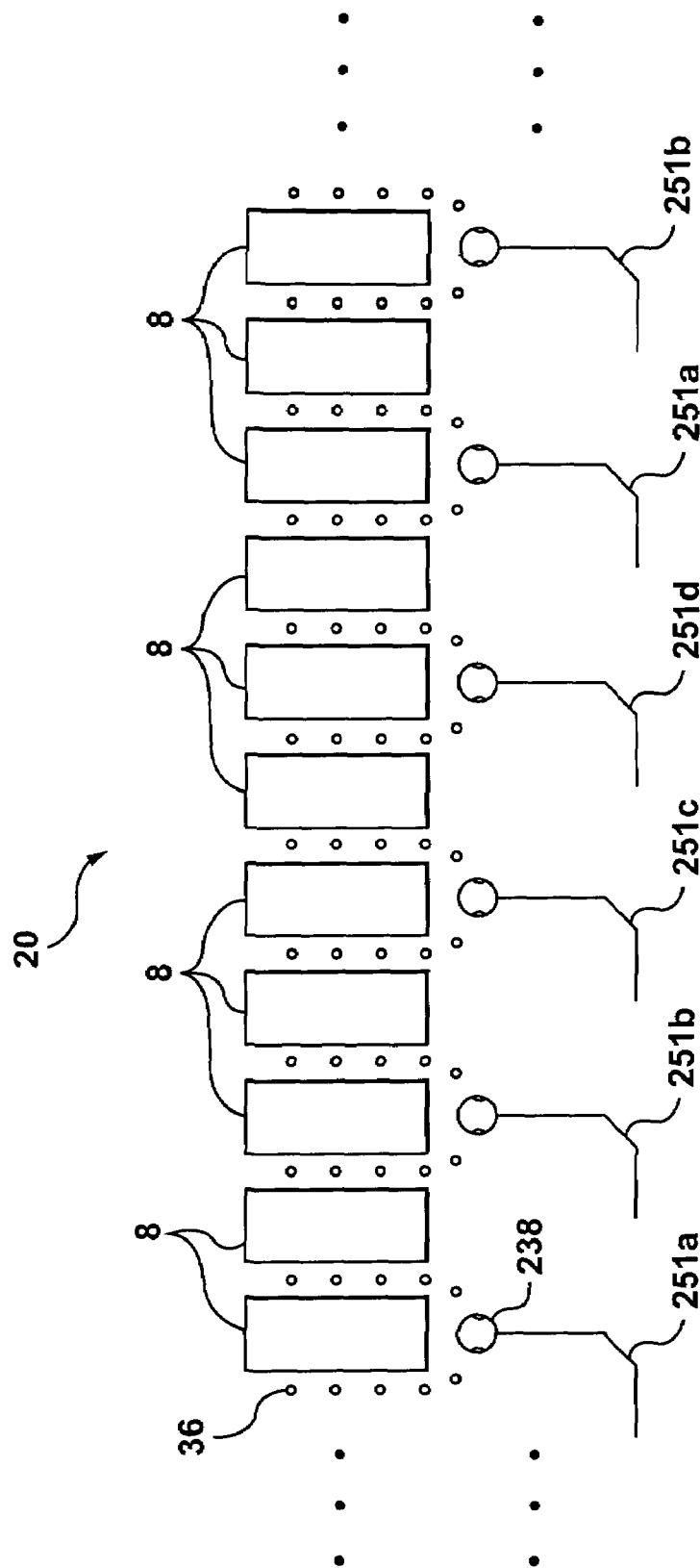

Referring to FIG. 7G, the aerators 238 and manifolds 251 may be configured so that each aerator 238 services both sides of a first rectangular skein 8 and one side of each of the two rectangular skeins 8 adjacent the first rectangular skein 8. For example, in the configuration shown, each aerator 238 has a line of holes 304 on each side so as to create two sheets of rising bubbles 36. An aerator 238 is located under each rectangular skein 8 and oriented so that the length of the aerator 238 is generally parallel to the length of the headers 22 of the vertical skeins 8. In this way each sheet of bubbles 36 rising from the aerators 238 tends to rise through the vertical gaps between adjacent rectangular skeins 8. When the supply of air at the higher flow rate is cycled in an A, B, C, D, A, B, C, D . . . pattern between the headers 251a–d, zones of low density rising tank water 18 move horizontally across the module 20. This movement causes horizontal as well as vertical motion of tank water 18 and may approximate the action of waves. Similar effects can also be achieved with aerators 238 and modules 20 of other configurations.

Figure 12:
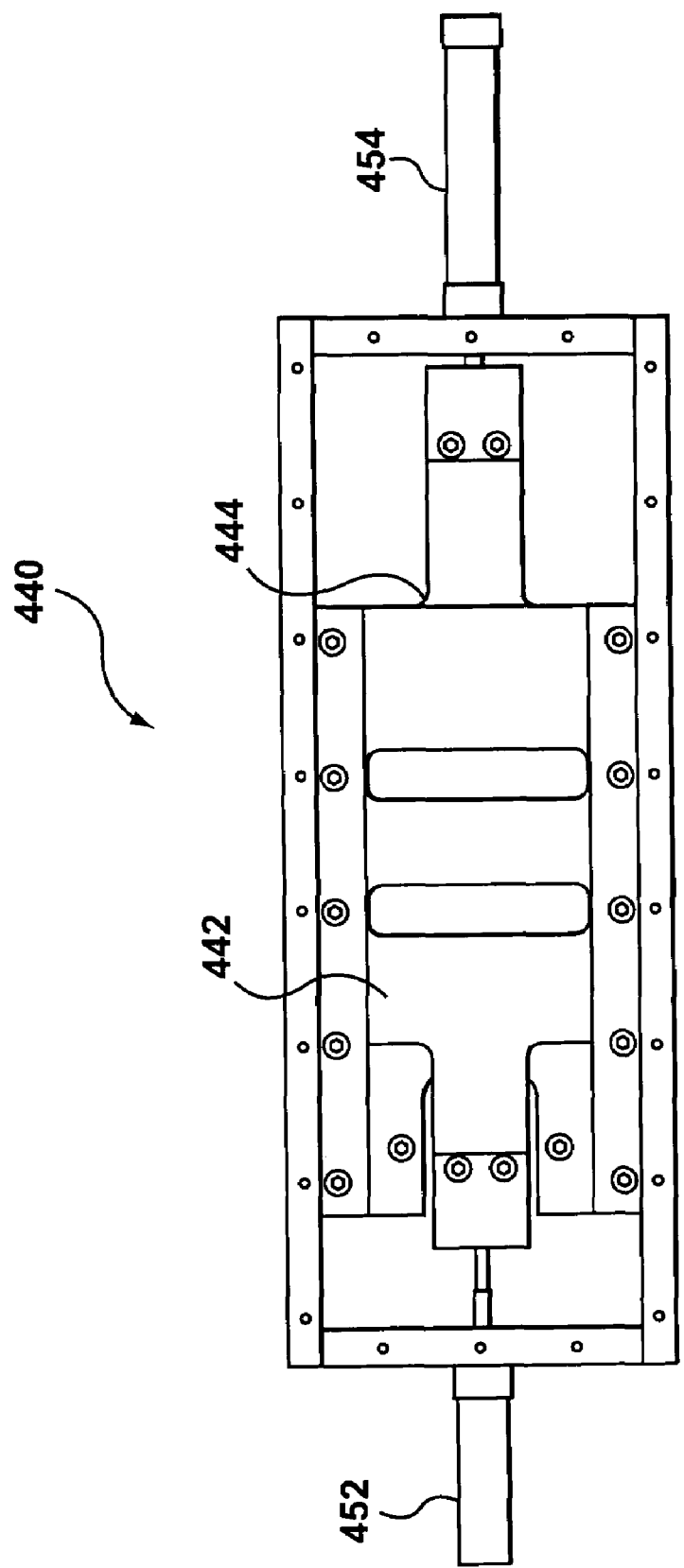
FIG. 12 is a plan view of a valve of the embodiment of FIGS. 7E, 7F and 7G.

Referring to FIG. 12, valve set 254 may also use a single, four-position valve 440. Valve 440 has two overlapping sliding plates 442, 444, with first plate openings 446 provided in first plate 442, and second plate openings 448 provided in second plate 444.

Plates 442, 444 shuttle back and forth under the influence of air cylinders 452, 454. First plate 442 is operatively connected to first air cylinder 452, and second plate 444 is operatively connected to second air cylinder 454. Air cylinders 452, 454 each have advanced and returned positions, and have different stroke lengths. The four possible combinations of advanced and returned positions of first and second air cylinders 452, 454 provides the four positions of valve 420.

Figure 13A:
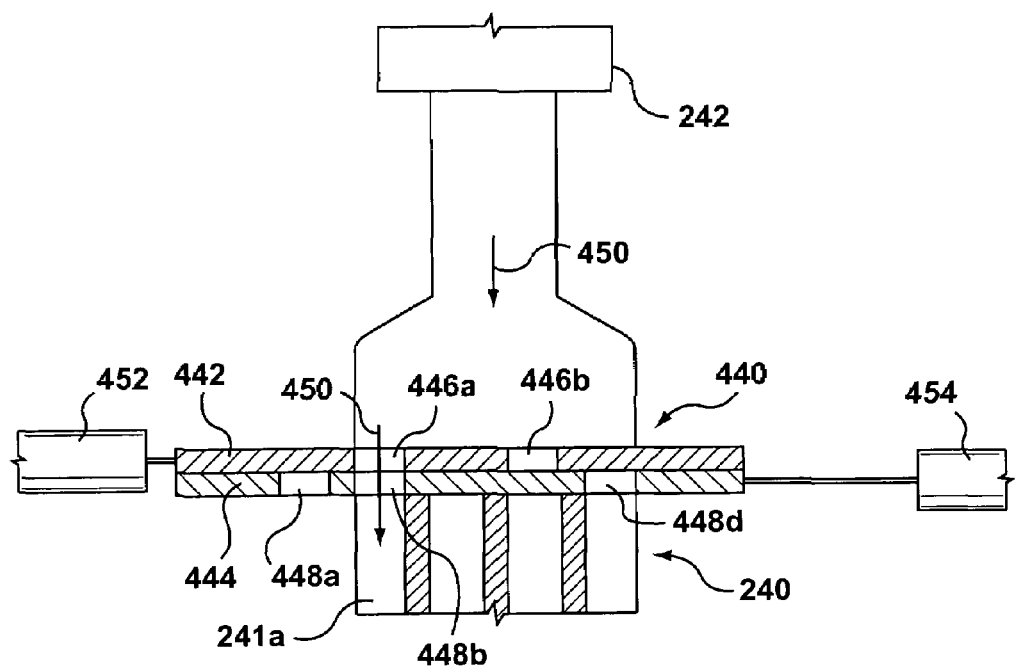
FIGS. 13A, 13B, 13C and 13D are FIG. 14 are elevational cross sections of the valve of the embodiment of FIGS. 7E, 7F and 7G.

The four positions of valve 440 are shown schematically in FIGS. 13A, 13B, 13C and 13D. In FIG. 13A, first cylinder 452 is in the returned position and second cylinder 454 is in the advanced position. This allows air at a high flow rate supplied by air supply 242 to flow through plate openings 446a and 448b and into first distinct branch 241a, as indicated by arrows 450.

Figure 13B:
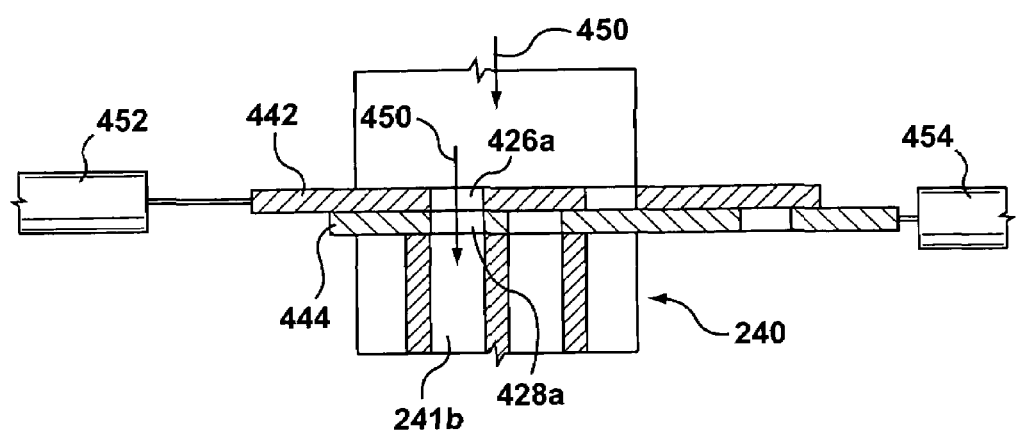

Referring now to FIG. 13B, valve 440 is shown in the second of the four valve positions. First cylinder 452 is in the advanced position and second cylinder 454 in the returned position, thereby aligning plate openings 446a and 448a with second distinct branch 241b.

Figure 13C:
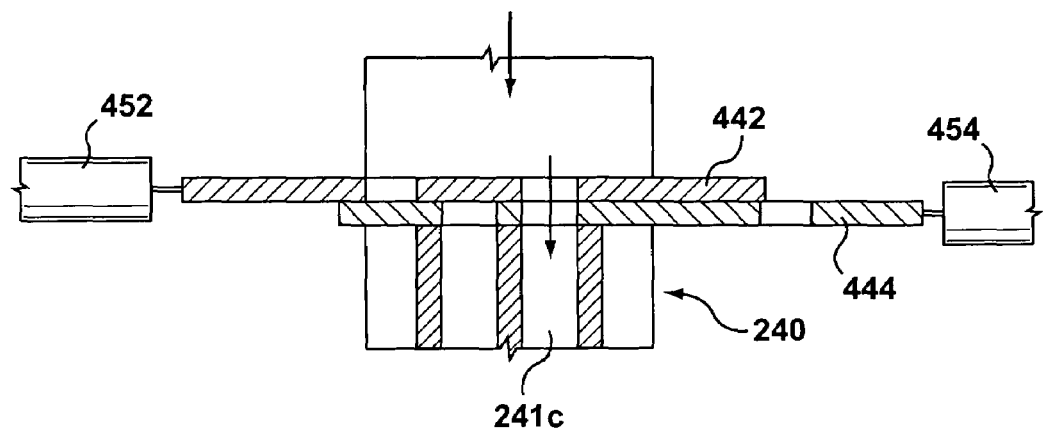
Figure 13D:
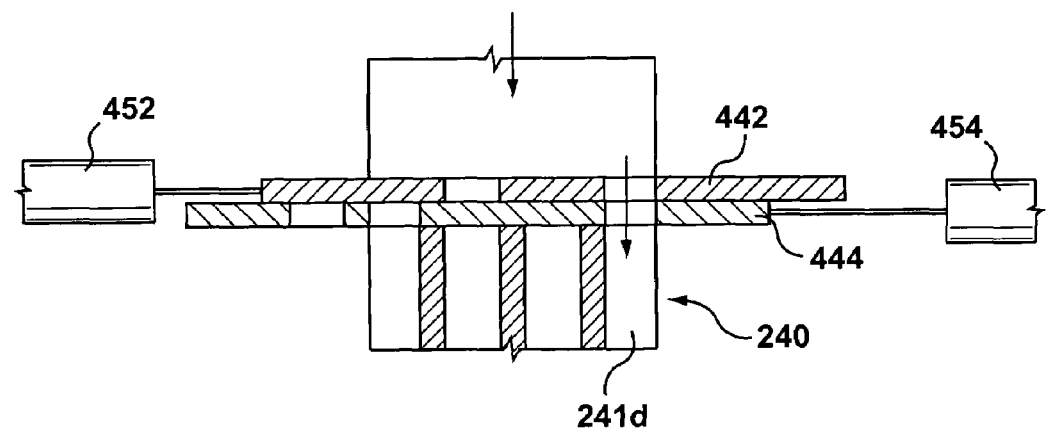

Similarly, FIGS. 13C and 13D show valve 440 in the third and fourth positions, respectively.

During operation, valve 440 advantageously reduces the risk of generating damaging pressure spikes. First and second plates 442 and 444 can be shuttled between the corresponding advanced and returned positions in a very short period of time. This creates a correspondingly brief period of time during which less than a fully open branch is in fluid communication with air supply 242. Further, valve 440 can be operated with simple two position hydraulic or pneumatic cylinders.

Furthermore, even when valve 440 is in transition between first and second positions, flow through a branch corresponding to the first valve position would only close off as flow through the branch corresponding the second valve position opens. The opening and closing is constrained to occur simultaneously, thereby ensuring that a certain amount of air can flow through valve 440 at all times.

Figure 14:
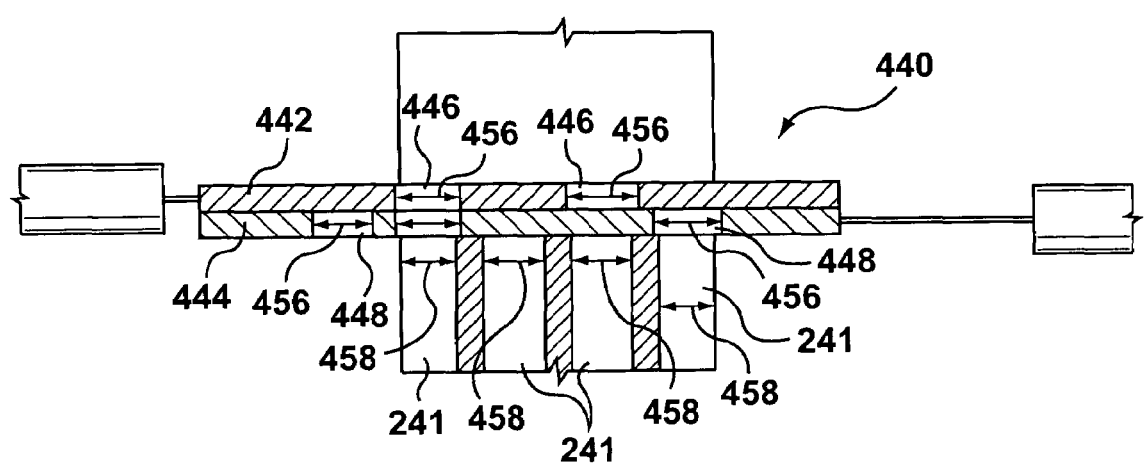

Referring now to FIG. 14, the width 456 of openings 446 and 448 may be increased relative to the width 458 of openings 241 of distinct branches 240 to further ensure that a certain amount of air can flow through valve 400 at all times. By increasing plate opening widths 456 so that they are wider than branch opening widths 458, paths for airflow through distinct branches will open sooner and close later as valve 440 shuttles between any two of the four valve positions. However, widths 456 may still be sufficiently narrow to ensure satisfactory sealing between branches when in any one of the four valve positions. Appropriate sizes for widths 456 will be a function of a number of factors, including, for example, the distance between adjacent branch inlet openings 241 and the maximum pressure permissible in the aeration system 437.

Conduit Aerators

Figure 9A:
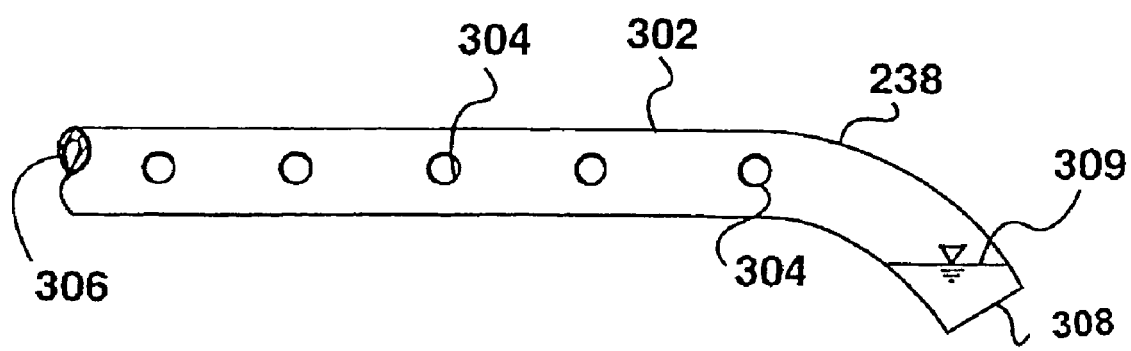
FIGS. 9A, 9B, 9C and 9D are drawings of aerators according to an embodiment of the invention.

Now referring to FIG. 9A, a conduit aerator 238 is shown. The conduit aerator 238 has an elongated hollow body 302 which is a circular pipe having an internal diameter between 15 mm and 100 mm. A series of holes 304 pierce the body 302 allowing air to flow out of the conduit aerator 238 to create bubbles. The size, number and location of holes may vary but for a rectangular skein 8, for example, 2 holes (one on each side) of between 5 mm and 10 mm in diameter placed every 50 mm to 100 mm along the body 302 and supplied with an airflow which results in a pressure drop through the holes of between 10 to 100 mm of water at the depth of the conduit aerator 238 are suitable.

Air enters the conduit aerator 238 at an aerator inlet 306. At the opposite end of the conduit aerator 238 is an outlet 308. The highest point on the outlet 308 is located below the lowest point on the aerator inlet 306 by a vertical distance between the minimum and maximum expected pressure drop of water at the depth of the conduit aerator 238 across the holes 304. The minimum expected pressure drop of water at the depth of the conduit aerator 238 across the holes 304 is preferably at least as much as the distance between the top of the holes 304 and the interior bottom of the body 302. An air/water interface 309 between the air in the conduit aerator 238 and the water surrounding the conduit aerator 238 will be located below the interior bottom of the body 302 but above the highest point on the outlet 308. In this way, tank water 18 entering the conduit aerator 238 will flow to the outlet 308 and not accumulate near the holes 304.

Figure 9B:
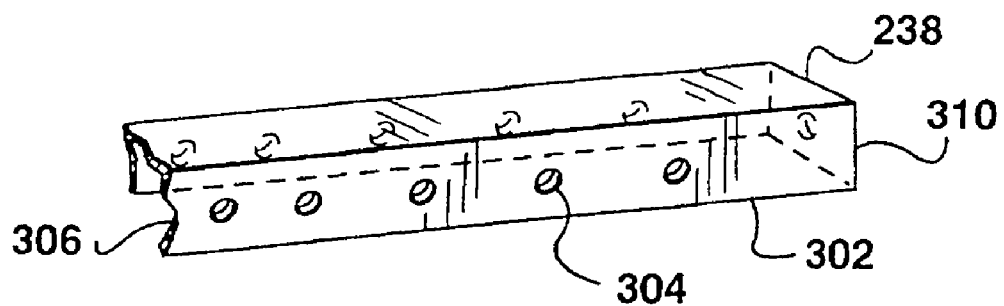

Now referring to FIG. 9B, another conduit aerator 238 is shown which is preferred for use with relatively clean tank water 18. The body 302 has a rectangular cross section but is open on the bottom. The conduit aerator 238 may be a separate component or integrated into the headers 22 of a membrane module 20 in which case the bottom of a lower header 22 may serve as the top of the body 302. The end of the body 302 is capped with a cap 310 which again may be a part of a header 22. With the bottom of the body 302 open to the tank water 18, tank water 18 which seeps into the conduit aerator 238 flows back to the tank water 18. To prevent bubbles 36 from forming at the bottom of the conduit aerator 238, the sides of the body 302 extend below the bottom of the holes 304 by a distance greater than the expected pressure drop through the holes 304.

Figure 9C:
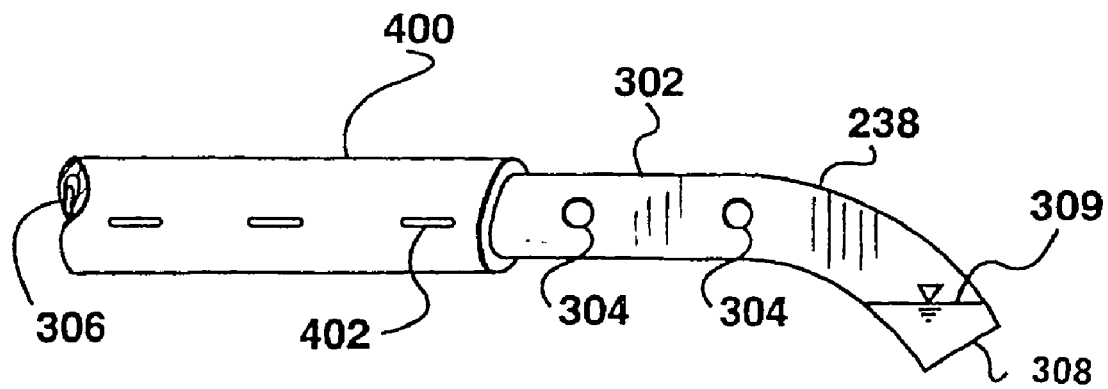

Now referring to FIG. 9C, another conduit aerator 238 is similar to the conduit aerator 238 of FIG. 9A except as will be described herein. A rubber sleeve 400, shown partially cut away, covers the body 302 and has slits 402 corresponding with the holes 304. The slits 402 open when air is flowed into the conduit aerator 238 opening to a larger size when a higher rate of air flow is used. Accordingly, the slits 402 produce larger bubbles 36 at the full rate of air flow and smaller bubbles 36 at the reduced rate of air flow. In wastewater applications, the reduced size of the bubbles 36 provides improved oxygen transfer efficiency at the reduced rate of air flow.

Figure 9D:
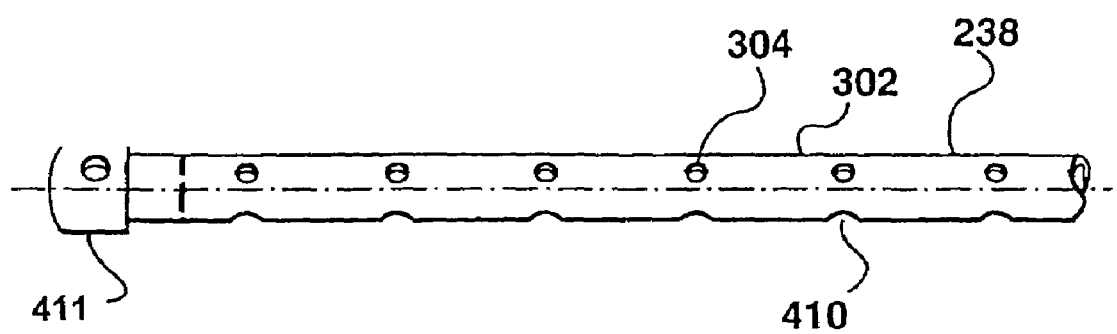

Now referring to FIG. 9D, another conduit aerator is shown which is preferred for use with relatively solids rich tank water 18. The body 302 is a tube 32 mm in diameter. The holes 304 are 8 mm in diameter and mounted 30 degrees upwards of horizontal. Drainage holes 410, at the bottom of the body 302 and typically 16 mm in diameter, allow tank water 18 seepage to drain from the body 302. A cap 411 covers the end of the body 302.

Figure 9E:
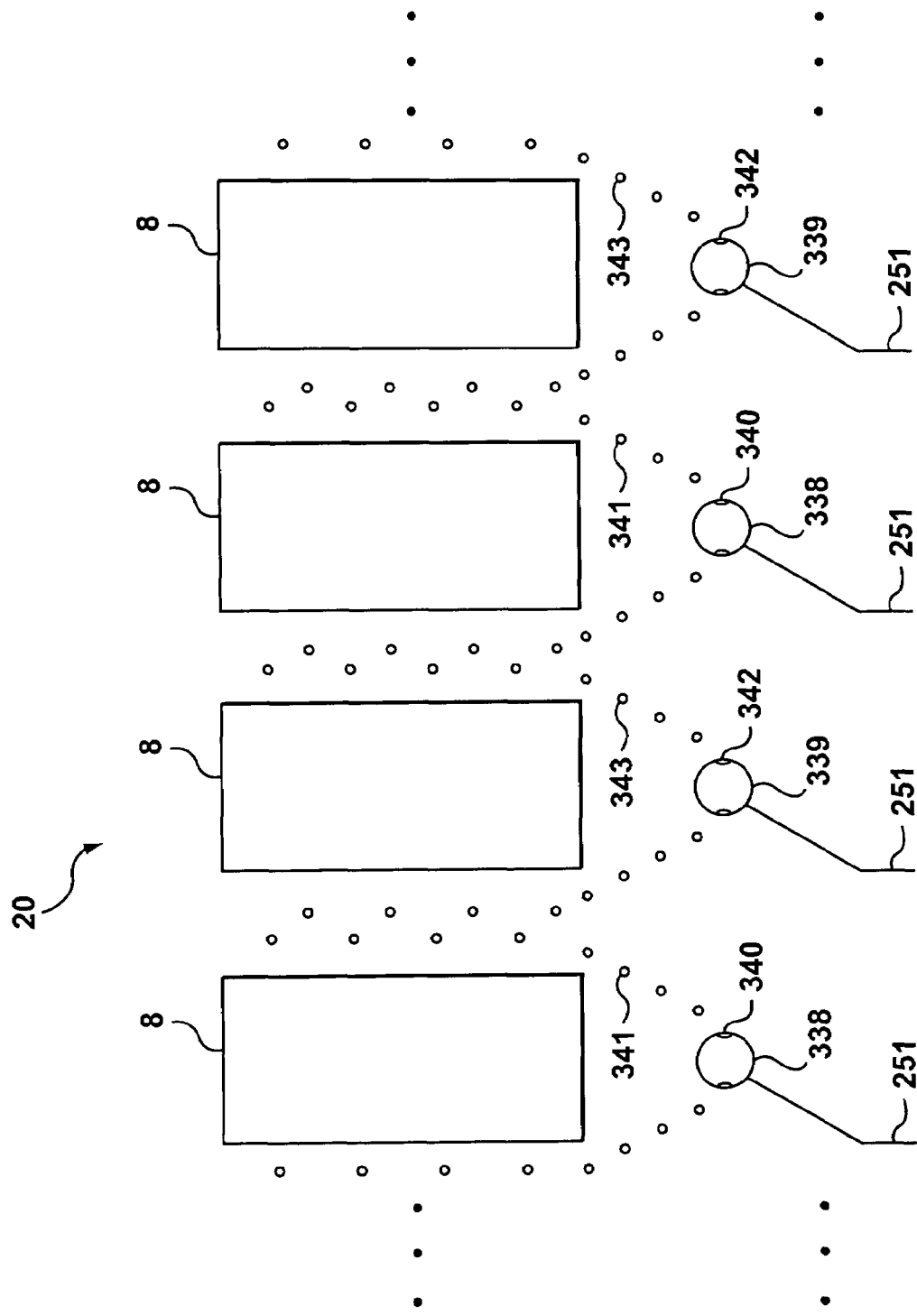
FIGS. 9E, 9F and 9G are schematic (9E) and isometric (9F and 9G) views of parts of the apparatus of FIGS. 7E, 7F, and 7G.
Figure 9F:
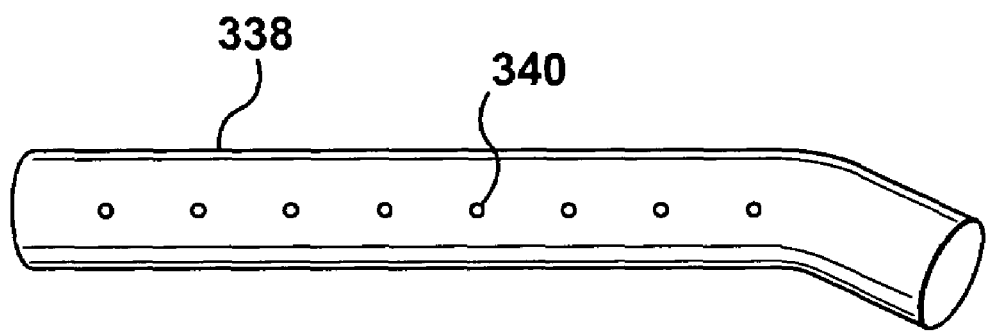
Figure 9G:
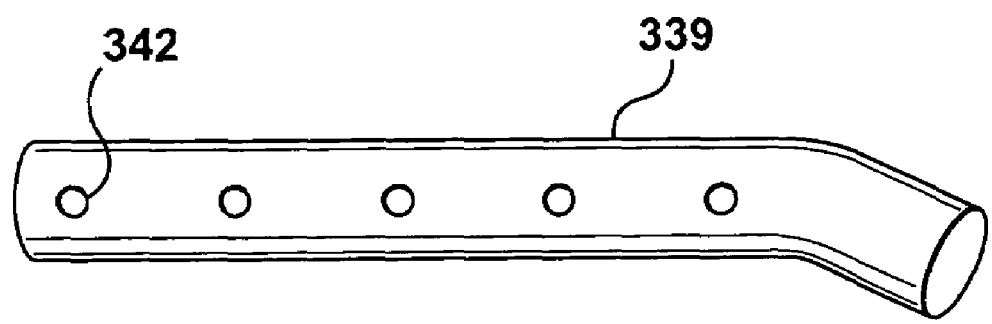

Now referring to FIG. 9E, another arrangement of conduit aerators 238 is shown in which first and second type aerators 338 and 339 are provided in cyclic aeration system 437. First type aerator 338 (FIG. 9F) has smaller holes 340 producing small aerating bubbles 341. Second type aerator 339 (FIG. 9G) has larger holes 342 producing large scouring bubbles 343. As shown in FIG. 9E, first and second type aerators may be interspersed with each other so that at least one first type aerator 338 and at least one second type aerator 339 are associated with each side of each rectangular skein 8. Air is cycled between the first and second types aerators to provide alternating fine and course bubble aeration. Since the fine bubbles produce very little air lift effect, transience is still created but oxygen transfer to the tank water 18 is improved which may be useful in bioreactors. The first type aerators 338 could also be located below the second type aerators 339 or other configurations may also be used so that each side of each rectangular skein 8 is associated with bubbles produced by both a first type aerator 338 and a second type aerator 339. However, since the first type aerator 338 is primarily used to oxygenate the tank water 18, the second type aerators 339 may also be used configured to provide all of the scouring bubbles 343 required and the first type aerators 338 located in any place appropriate for oxygenating bubbles 341, which may even be in a part of a reactor 10 remote from the modules 20.

Conduit aerators 238 such as those described above may admit some tank water 18, even with air flowing through them, which dries out leaving an accumulation of solids. When the supply of air is switched between manifolds as described above, however, the conduit aerator 238 is alternately flooded and emptied. The difference in water elevation within the body 302 corresponds to the air pressure loss across the holes 304 between the high and low air flow conditions. The resulting cyclical wetting of the conduit aerators 238 helps re-wet and remove solids accumulating in the conduit aerators 238 or to prevent tank water 18 from drying and depositing solids in the conduit aerators 238. If necessary, this flooding can be encouraged by releasing air from the appropriate manifold by opening a valve vented to atmosphere. Embodiments similar to those described above can be made in many alternate configurations and operated according to many alternate methods within the teachings of the invention.

EXAMPLES

The following examples refer to ZW 500 membrane modules produced by ZENON Environmental Inc. Each ZW 500 has two rectangular skeins of vertical hollow fiber membranes. For the purposes of calculating superficial velocities, the cross sectional area of aeration for each ZW 500 membrane module is approximately 0.175 m$^2$. All air flow rates given below are at standard conditions.

Example 1

Figure 10A:
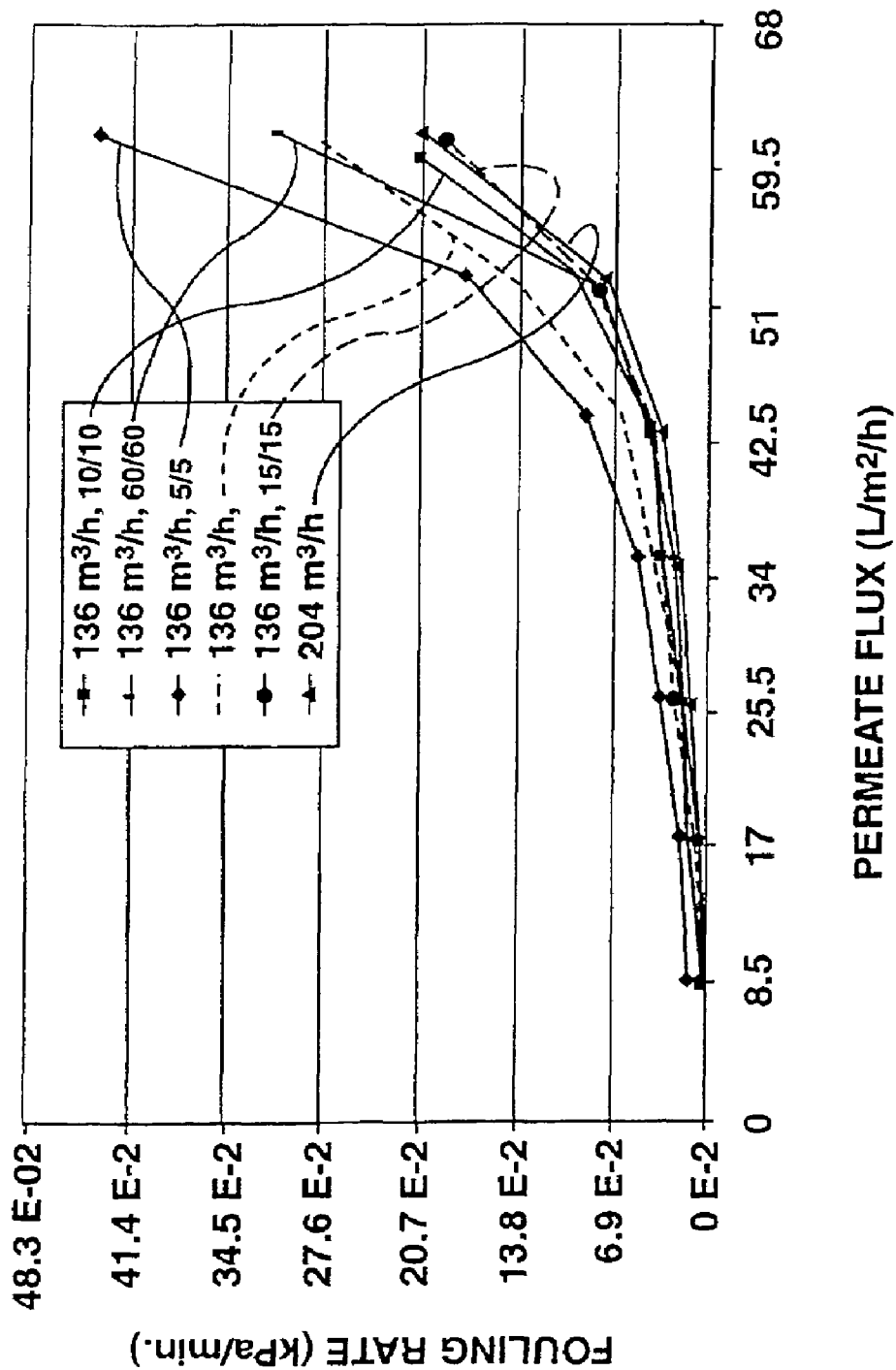
FIGS. 10A, 10B and 10C are charts showing the results of tests performed on embodiments of the invention having two groups of aerators.

A cassette of 8 ZW 500 membrane modules were operated in bentonite suspension under generally constant process parameters but for changes in flux and aeration. A fouling rate of the membranes was monitored to assess the effectiveness of the aeration. Aeration was supplied to the cassette at constant rates of 204 m$^3$/h (ie. 25.5 m$^3$/h per module) and 136 m$^3$/h and according to various cycling regimes. In the cycled tests, a total air supply of 136 m$^3$/h was cycled between aerators located below the modules and aerators located between and beside the modules in cycles of the durations indicated in FIG. 10A. Aeration at 136 m$^3$/h in 30 second cycles (15 seconds of air to each set of aerators) was approximately as effective as non-cycled aeration at 204 m$^3$/h.

Example 2

Figure 10B:
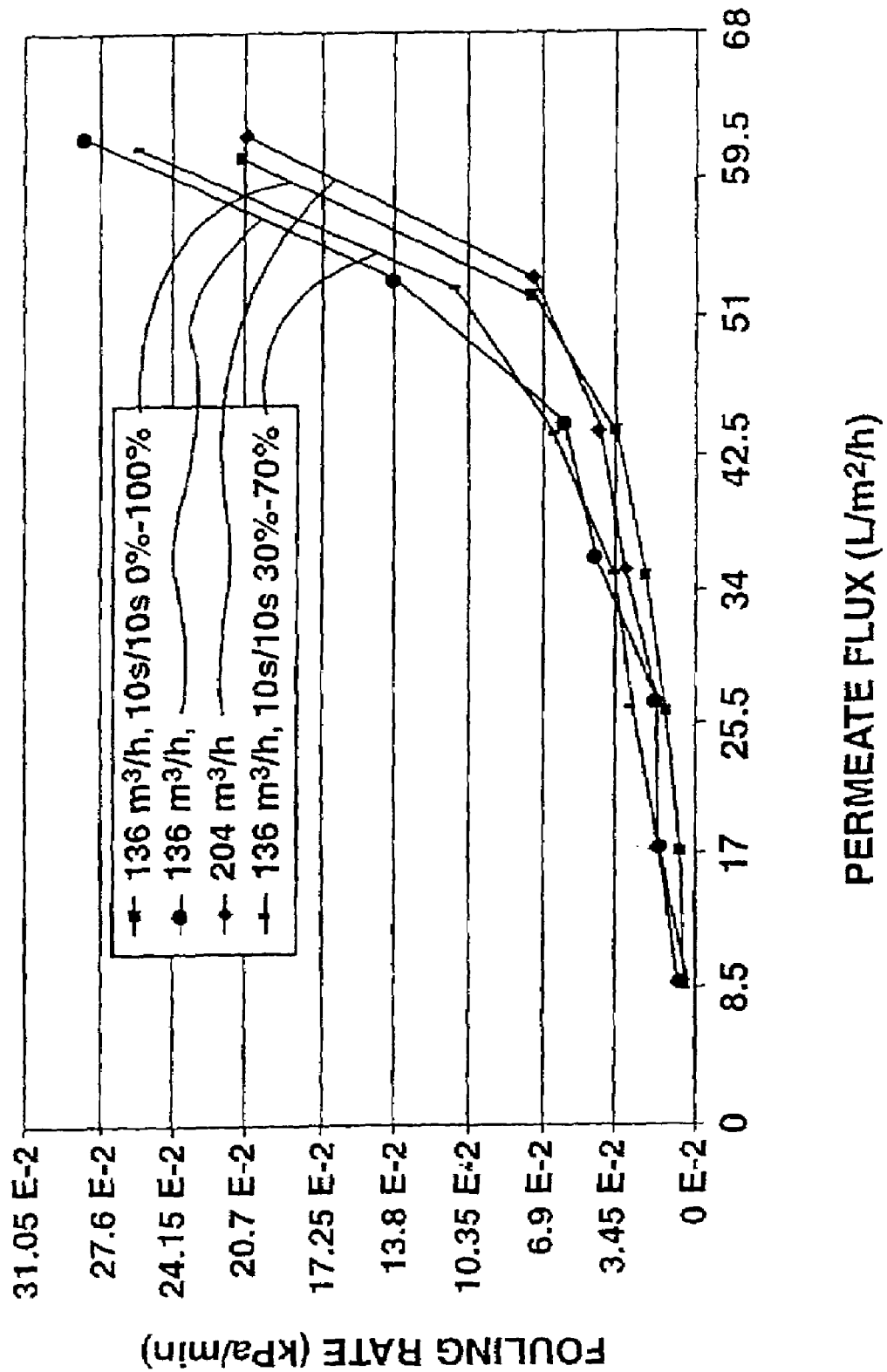

The same apparatus as described in example 1 was tested under generally constant process parameters but for the variations in air flow indicated in FIG. 10B. In particular, 70% of the total air flow of 136 m$^3$/h was cycled in a 20 second cycle such that each group of aerators received 70% of the total airflow for 10 seconds and 30% of the total airflow for 10 seconds. As shown in FIG. 10B, cycling 70% of the air flow resulted in reduced fouling rate at high permeate flux compared to constant aeration at the same total air flow.

Example 3

Figure 10C:
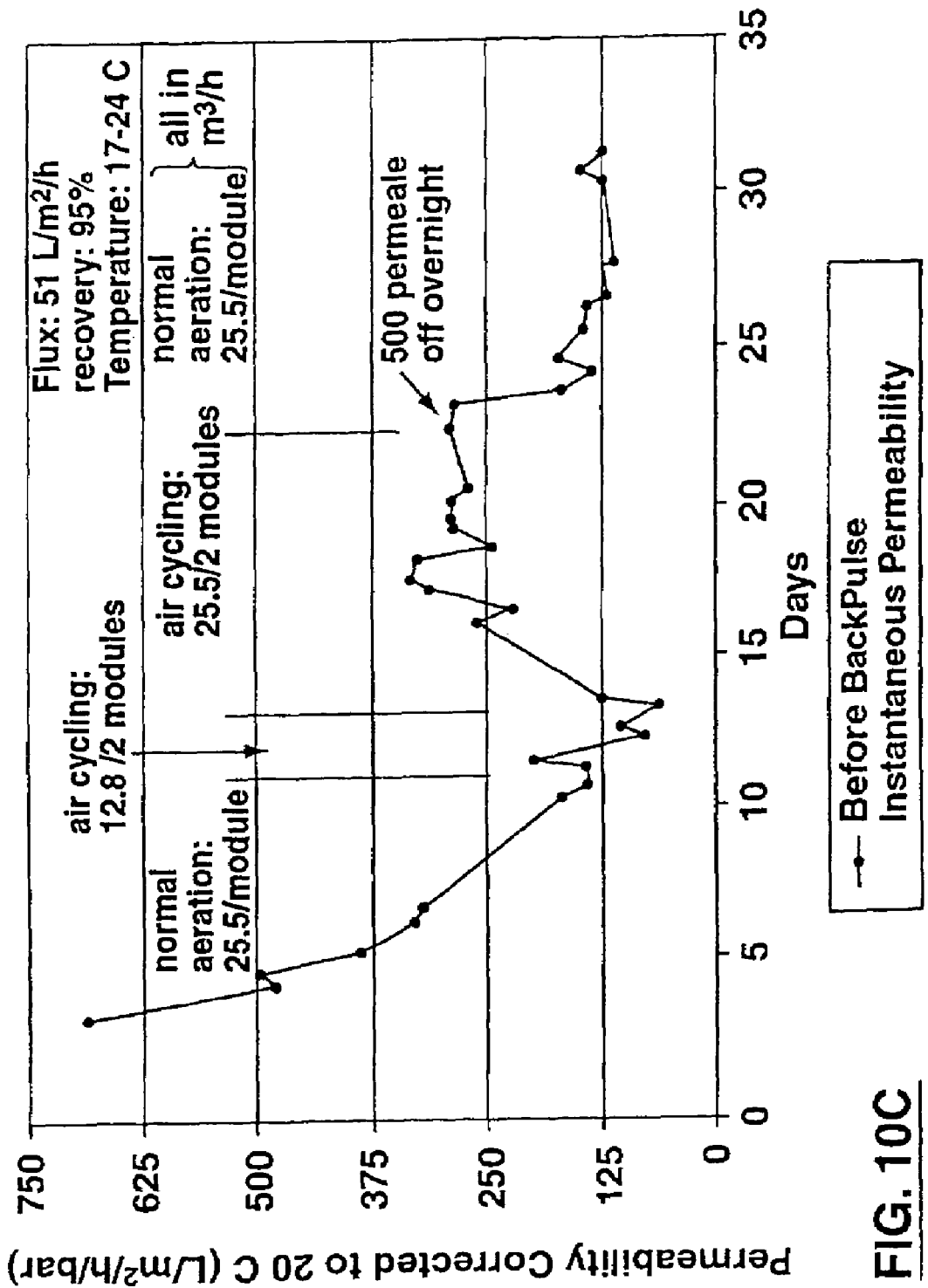

2 ZW 500 membrane modules were operated to produce drinking water from a natural supply of feed water. Operating parameters were kept constant but for changes in aeration. The modules were first operated for approximately 10 days with non-cycled aeration at 25.5 m$^3$/h per module (for a total system airflow 51 m$^3$/h). For a subsequent period of about three days, air was cycled from aerators near one set of modules to aerators near another set of modules such that each module was aerated at 12.8 m$^3$/h for 10 seconds and then not aerated for a period of 10 seconds (for a total system airflow of 12.8 m$^3$/h). For a subsequent period of about 10 days, the modules were aerated such that each module was aerated at 25.5 m$^3$/h for 10 seconds and then not aerated for a period of 10 seconds (for a total system airflow of 25.5 m$^3$/h). For a subsequent period of about 10 days, the initial constant airflow was restored. As shown in FIG. 10C, with aeration such that each module was aerated at 25.5 m$^3$/h for 10 seconds and then not aerated for a period of 10 seconds (ie. one half of the initial total system airflow), the membrane permeability stabilized at over 250 L/m$^2$/h/bar whereas with non-cycled airflow at the initial total system airflow the membrane permeability stabilised at only about 125 L/m$^2$/h/bar.

Example 4

3 units each containing 2 ZW 500 membrane modules were operated at various fluxes in a membrane bioreactor. Unit 1 had modules operating at 26 L/m$^2$/h and 51 L/m$^2$/h. Unit 2 had modules operating at 31 L/m$^2$/h and 46 L/m$^2$/h. Unit 3 had modules operating at 34 L/m$^2$/h and 51 L/m$^2$/h. The units were first operated for a period of about 10 days with non cycled aeration at 42.5 m$^3$/h per module (total system air flow of 85 m$^3$/h). The permeability decreased and stabilized at between 250 and 275 L/m$^2$/h/bar for Unit 1, between 200 and 225 L/m$^2$/h/bar for Unit 2 and between 150 and 175 L/m$^2$/h/bar for Unit 3. For a second period of about 14 days, a total system airflow of 61.2 m$^3$/h was applied for 10 seconds to aerators below the modules and then for 10 seconds to aerators beside the modules. Under these conditions, permeability increased and stabilized at between 350 and 375 L/m$^2$/h/bar for Unit 1 and between 325 and 350 L/m$^2$/h/bar for Units 2 and 3.

Example 5

Figure 11:
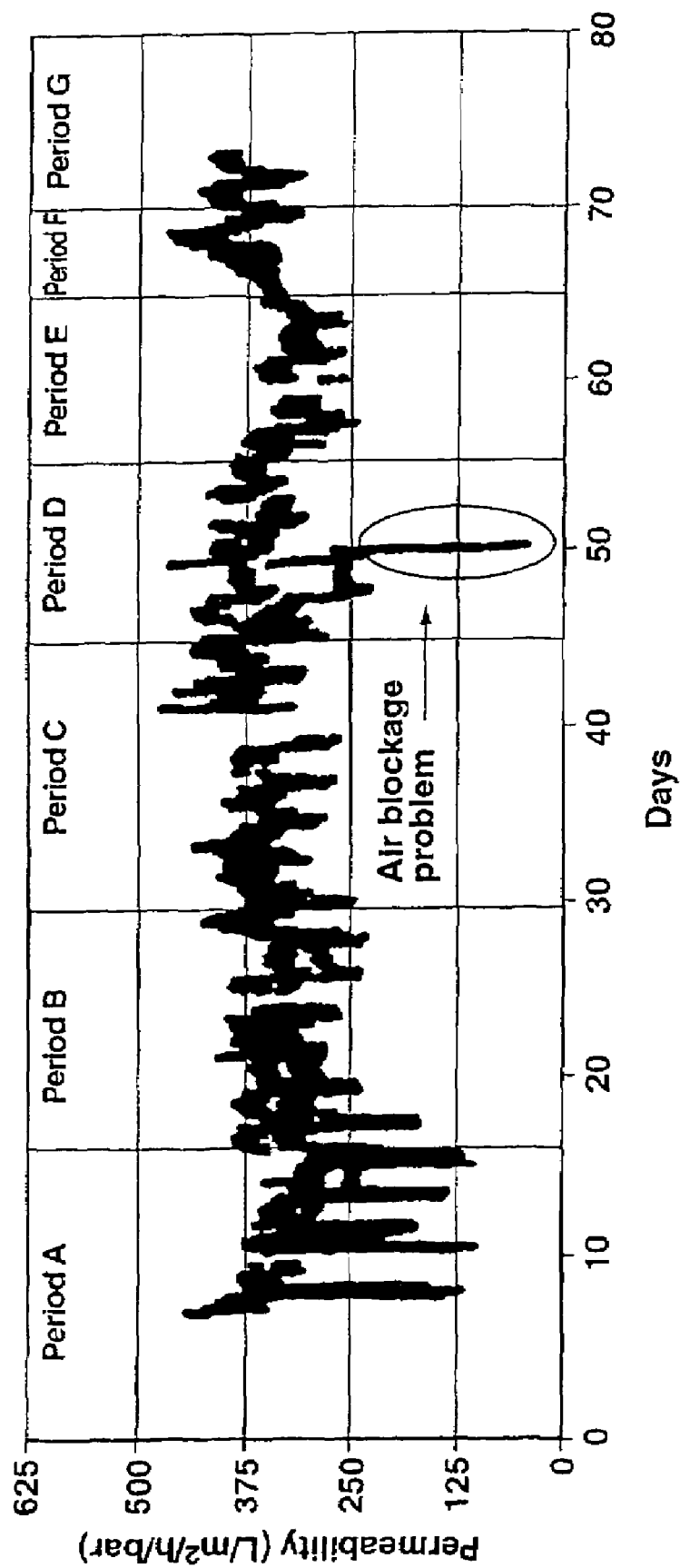
FIG. 11 is a chart showing the results of tests performed on embodiments of the invention having a single group of aerators.

A cassette of 6 ZW 500 modules was used to treat sewage. While holding other process parameters generally constant, aeration was varied and permeability of the modules was measured periodically as shown in FIG. 11. In period A, 255 m$^3$/h of air was supplied continuously and evenly to the modules. In period B, 184 m$^3$/h of air was applied for 10 seconds to aerators below the modules and then for 10 seconds to aerators beside the modules. In Period C, the same aeration regime was used, but shrouding around the modules was altered. In period D, 184 m$^3$/h of air was applied for 10 seconds to aerators near a first set of modules and then for 10 seconds to aerators near a second set of modules. In period E, 204 m$^3$/h of air was applied to all of the modules evenly for 10 seconds and then no air was supplied to the modules for 10 seconds. In Period F, 306 m³/h was applied to all of the modules evenly for 10 seconds and then no air was supplied to the modules for 10 seconds. In Period G, 153 m³/h was applied to aerators near a first set of modules and then for 10 seconds to aerators near a second set of modules.

Example 6

A single ZW 500 membrane module was used to filter a supply of surface water. While keeping other process parameters constant, the module was operated under various aeration regimes and its permeability recorded periodically. First the module was operated with constant aeration at (a) 20.4 m³/h and (b) 25.5 m³/h. After an initial decrease in permeability, permeability stabilised at (a) about 200 L/m²/h/bar and (b) between 275 and 300 L/m²/h/bar respectively. In a first experiment, aeration was supplied to the module at 25.5 m³/h for two minutes and then turned off for 2 minutes. In this trial, permeability decreased rapidly and could not be sustained at acceptable levels. In another experiment, however, aeration was supplied to the module at 25.5 m³/h for 30 seconds and then at 8.5 m³/h for 30 seconds. In this trial, permeability again decreased initially but then stabilised at between 275 and 300 L/m²/h/bar.

We claim:

1. An apparatus to aerate tank water comprising:
   a) at least one tank having tank water and at least one membrane module immersed in the tank water;
   b) an air delivery network having a plurality of distinct branches;
   c) one or more aerators in fluid communication with the distinct branches of the air delivery network and mountable below the at least one membrane module;
   d) an air supply to provide an initial air flow at an initial flow rate;
   e) one or more valves in a valve sat in fluid communication with the air supply and having distinct outlets in fluid communication with the distinct branches of the air delivery network; and,
   f) a valve set controller to control the valves of the valve set; wherein
   g) the valve set controller automatically operates the valves to (i) split the initial air flow such that at least one of the distinct branches of sir delivery network receives air at a higher flow rate and at least one other of the distinct branches of the air delivery network receives air at a lower flow rate, the lower flow rate being less than one half of the higher flow rate, and (ii) switch which branch or branches of the air delivery network receive air at the higher flow rate and the lower flow rate in repeated cycles; and,
   h) the valve set controller is operable to switch which branch or branches of the air delivery network receive air at the higher flow rate and the lower flow rate in repeated cycles of less than about 120 seconds in duration.

2. The apparatus of claim 1 wherein the aerators are disposed adjacent each other and arranged in at least one set, wherein each set includes a quantity of adjacent aerators equal to the number of distinct branches of the air delivery network, and wherein only one aerator in each set is associated with any one distinct branch of the plurality of branches of the air delivery network.

3. The apparatus of claim 2 having at least two membrane modules.

4. The apparatus of claim 3 wherein the membrane modules are disposed adjacent to each other, each membrane module having rectangular skeins of vertically oriented hollow fibre membranes between upper and lower headers, the upper and lower headers of each rectangular skein being aligned parallel with the upper and lower headers of the adjacent rectangular skeins of adjacent membrane modules.

5. The apparatus of claim 4 wherein each membrane module comprises one or two rectangular skeins.

6. The apparatus of claim 5 wherein the aerators are conduit aerators having a length approximately as long as the headers of the rectangular skeins and the aerators are disposed parallel to the headers of the rectangular skeins.

7. The apparatus of claim 6 wherein the aerators are provided directly below only one membrane module of any two adjacent membrane modules.

8. The apparatus of claim 7 wherein either side of each aerator has a series of holes for providing a column of air bubbles between the membrane module below which each aerator is located and the membrane modules on either side of the membrane module below which each aerator is located.

9. The apparatus of claim 1 wherein in a pair of any two adjacent aerators, the holes of one aerator of the pair of aerators have a larger diameter and the holes of the other aerator of the pair of aerators have a smaller diameter.

10. The apparatus of claim 8 wherein in a pair of any two adjacent aerators, only one aerator of the pair of aerators is covered by a resilient sleeve having slits corresponding to the holes in the aerator.

11. The apparatus of claim 2 wherein there are at least three distinct branches of the sir delivery network and each of the distinct branches of the air delivery network receives air at the higher flow rate for about the same period of time within each cycle.

12. The apparatus of claim 11 wherein there are four distinct branches of the air delivery network.

13. The apparatus of claim 12 comprising 12 adjacent aerators so that each set has four aerators.

14. The apparatus of claim 13 wherein each distinct branch receives air at the higher flow rate for about 5 to 10 seconds.

15. An apparatus to aerate tank water comprising:
   a) at least one tank having tank water and at least one membrane module immersed in the tank water;
   b) an air delivery network having a plurality of distinct branches;
   c) one or more aerators in fluid communication with the distinct branches of the air delivery network and mountable below the at least one membrane module;
   d) an air supply to provide an initial air flow at an initial flow rate;
   e) one or more valves in a valve set in fluid communication with the air supply and having distinct outlets in fluid communication with the distinct branches of the air delivery network; and,
   f) a valve set controller to control the valves of the valve set; wherein
   g) the valve set controller automatically operates the valves to (i) split the initial air flow such that at least one of the distinct branches of air delivery network receives air at a higher flow rate and at least one other of the distinct branches of the air delivery network receives air at a lower flow rate, the lower flow rate being less than one half of the higher flow rate, and (ii) switch which branch or branches of the air delivery network receive air at the higher flow rate and the lower flow rate in repeated cycles;

h) the valve set controller is operable to switch which branch or branches of the air delivery network receive air at the higher flow rate and the lower flow rate in repeated cycles of less than about 120 seconds in duration; and i) the aerators are conduit aerators having holes along a length of conduit, and the aerators provide larger bubbles and smaller bubbles in association with each membrane module.

16. The apparatus of claim 15 wherein one or more of the conduit aerators are covered by a resilient sleeve having slits corresponding to holes in the aerator.

17. The apparatus of claim 15 wherein first and second types of aerators are provided, the first type of aerator having smaller holes and the second type of aerator having larger holes, and wherein at least one of the first type of aerators and at least one of the second type of aerators are associated with each membrane module.

18. An apparatus to aerate tank water comprising:

a) at least one tank having tank water and at least one membrane module immersed in the tank water;

b) an air delivery network having at least four distinct branches;

c) one or more aerators in fluid communication with the distinct branches of the air delivery network and mountable below the at least one membrane module;

d) an air supply to provide an initial air flow at an initial flow rate;

e) one or more valves in a valve set in fluid communication with the air supply and having distinct outlets in fluid communication with the distinct branches of the air delivery network; and, f) a valve set controller to control the valves of the valve set; wherein g) the valve set controller automatically operates the valves to (i) split the initial air flow such that at least one of the distinct branches of air delivery network receives air at a higher flow rate and at least one other of the distinct branches of the air delivery network receives air at a lower flow rate, the lower flow rate being less than one half of the higher flow rate, and (ii) switch which branch or branches of the air delivery network receive air at the higher flow rate and the lower flow rate in repeated cycles;

h) the valve set controller is operable to switch which branch or branches of the air delivery network receive air at the higher flow rate and the lower flow rate in repeated cycles of less than about 120 seconds in duration; and i) at least one valve of the valve set is a four-position valve, the four positions provided by first and second air cylinders having different stroke lengths and each air cylinder having advanced and returned positions.

19. The apparatus of claim 18 wherein the four position valve has first and second overlapping sliding plates disposed transversely across the airflow provided by the air supply, the first plate has first plate openings, and the second plate has second plate openings, and wherein for each of the four positions of the valve, one of the first plate openings is aligned with one of the second plate openings and with a unique one of the distinct branches of the air delivery network.

20. The apparatus of claim 19 wherein the openings in the plates each have an opening width which is approximately equal to the sum of the width of the inlet opening of the branches and the and the spacing between adjacent branches of the air delivery network.

21. The apparatus of claim 19 wherein at least one valve of the valve set is a four position valve wherein the positions are provided by a rotating drum.

22. The apparatus of claim 1 wherein the air delivery network has first and second branches and the aerators associated with the first branch are interspersed in a horizontal plane with aerators associated with the second branch such that adjacent aerators are in fluid communication with different distinct branches of the air delivery system.

23. The apparatus of claim 1 wherein the membrane modules have rectangular skeins of vertically oriented hollow fibre membranes between upper and lower headers, the aerators are conduit aerators approximately as long as the headers of the rectangular skeins and the aerators are mounted parallel to the headers of the rectangular skeins.

24. The apparatus of claim 23 wherein 1 or 2 rectangular skeins are associated with each conduit aerator.

25. The apparatus of claim 1 wherein the air supply is sized to provide a higher flow rate corresponding to a superficial velocity in relation to the aerators receiving the flow of air of between 0.013 and 0.15 m/s.

26. The apparatus of claim 1 wherein the lower flow rate is an air off condition.

27. The apparatus of claim 1 wherein the lower flow rate is about 10% or less of the higher flow rate.

28. The apparatus of claim 1 wherein the lower flow rate is about 5% or less of the higher flow rate.

* * * * *